US012724291B2

(12) United States Patent
Daiku

(10) Patent No.: US 12,724,291 B2
(45) Date of Patent: Sep. 1, 2026

(54) OPTICAL DEVICE FOR AERIAL DISPLAY APPARATUS, AND AERIAL DISPLAY APPARATUS

(71) Applicant: TOPPAN Holdings Inc., Tokyo (JP)

(72) Inventor: Yasuhiro Daiku, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 317 days.

(21) Appl. No.: 18/409,506

(22) Filed: Jan. 10, 2024

(65) Prior Publication Data

US 2024/0142798 A1 May 2, 2024

Related U.S. Application Data

(63) Continuation of application No. PCT/JP2022/027381, filed on Jul. 12, 2022.

(30) Foreign Application Priority Data

Jul. 12, 2021 (JP) ................................ 2021-114801
Jun. 8, 2022 (JP) ................................ 2022-093210

(51) Int. Cl.
*G02B 30/56* (2020.01)
*G02B 5/04* (2006.01)

(52) U.S. Cl.
CPC ............. *G02B 30/56* (2020.01); *G02B 5/045* (2013.01)

(58) Field of Classification Search
CPC .......... G02B 30/56; G02B 5/045; G02B 5/00; G02B 5/04

(Continued)

(56) References Cited

U.S. PATENT DOCUMENTS 10,962,797 B2 3/2021 Ito et al.
2007/0091431 A1 4/2007 Mezouari et al.
(Continued)

FOREIGN PATENT DOCUMENTS

CN 108027522 A 5/2018
EP 3809189 A1 4/2021
(Continued)

OTHER PUBLICATIONS

The extended European search report issued by the European Patent Office on Oct. 29, 2024, which corresponds to European Patent Application No. 22842106.1-1001 and is related to U.S. Appl. No. 18/409,506.

(Continued)

*Primary Examiner* — William R Alexander
(74) *Attorney, Agent, or Firm* — Studebaker Brackett PLLC

(57) ABSTRACT

An aerial display apparatus includes: a display device configured to display an image; and an optical device arranged to receive light from the display device and reflecting the light from the display device to a side opposite to the display device. The optical device includes a planar base member, and a plurality of optical elements provided below the base member as viewed from a viewer, each extending in a first direction and aligned in a second direction orthogonal to the first direction. Each of the optical elements has an incident surface and a reflection surface which are inclined with respect to a normal direction of the base member and are in contact with each other.

17 Claims, 20 Drawing Sheets

(58) Field of Classification Search
USPC .......................................................... 359/462
See application file for complete search history.

(56) References Cited

U.S. PATENT DOCUMENTS

| | | | | |
|---|---|---|---|---|
| 2011/0149391 | A1* | 6/2011 | Brott ...................... | G02B 30/27 359/463 |
| 2018/0031757 | A1* | 2/2018 | Johnson ................. | G02B 5/021 |
| 2018/0067329 | A1* | 3/2018 | Kim ..................... | H04N 13/324 |
| 2018/0188549 | A1* | 7/2018 | Frayne ................... | G02B 30/25 |
| 2019/0179062 | A1 | 6/2019 | Nawata et al. | |
| 2019/0179160 | A1 | 6/2019 | Ito et al. | |
| 2020/0264347 | A1 | 8/2020 | Liu et al. | |
| 2021/0096393 | A1 | 4/2021 | Daiku | |
| 2024/0427169 | A1* | 12/2024 | Daiku .................... | G02B 30/56 |

FOREIGN PATENT DOCUMENTS

| | | | |
|---|---|---|---|
| EP | 4116761 | A1 | 1/2023 |
| JP | 2011-175297 | | 9/2011 |
| JP | 2011-191404 | | 9/2011 |
| JP | 2012-42518 | | 3/2012 |
| JP | 2012-133128 | | 7/2012 |
| JP | 2018-092133 | | 6/2018 |
| JP | 2019-032404 | A | 2/2019 |
| JP | 2019-105744 | | 6/2019 |
| TW | 202004265 | A | 1/2020 |
| WO | WO 2019/240137 | A1 | 12/2019 |

OTHER PUBLICATIONS

English Translation of IPRP (PCT/IB/338 and PCT/IB/373) (Jan. 25, 2024 and Jan. 16, 2024) and the Written Opinion of ISA (PCT/ISA/237) issued in International Application No. PCT/JP2022/027381 dated Aug. 16, 2022 (7 pages).

International Search Report issued in International Application No. PCT/JP2022/027381 dated Aug. 16, 2022.

Written Opinion issued in International Application No. PCT/JP2022/027381 dated Aug. 16, 2022.

Taiwanese Office Action issued in counterpart Taiwanese Application No. 111125666 dated Jun. 12, 2023.

* cited by examiner

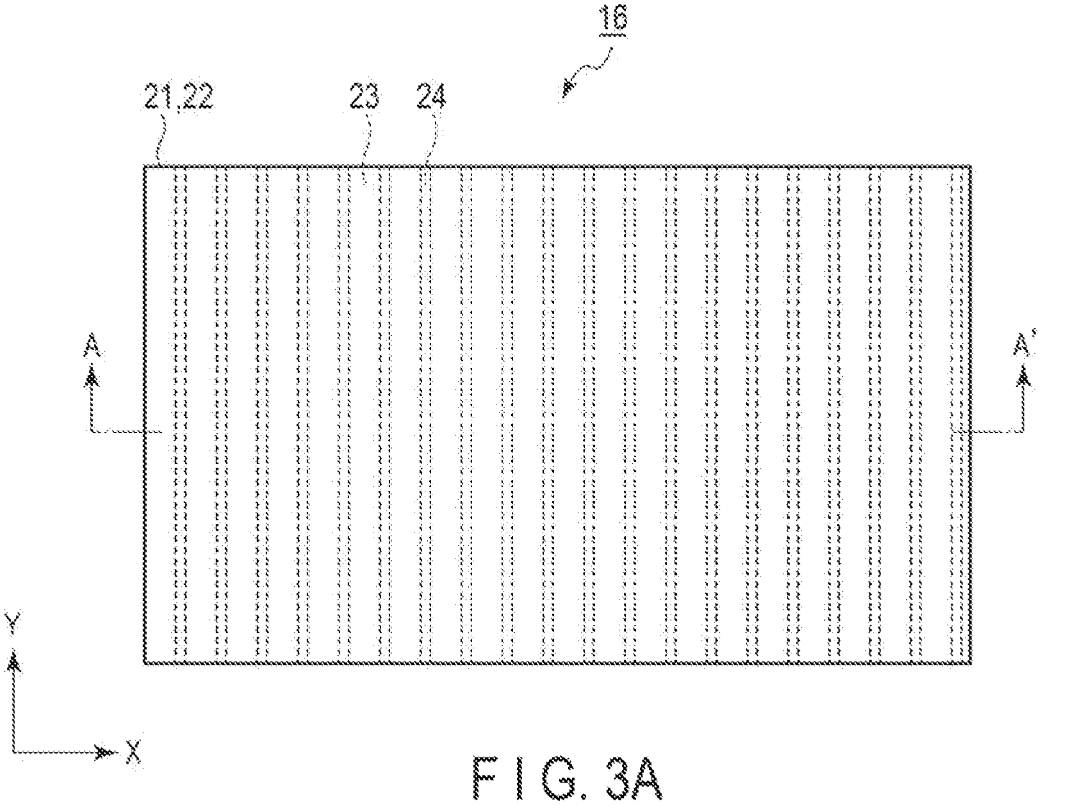
F I G. 3A
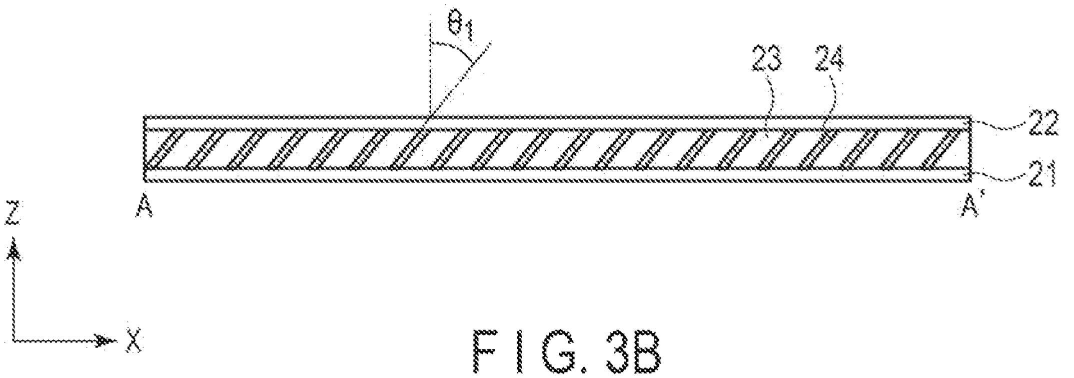
F I G. 3B

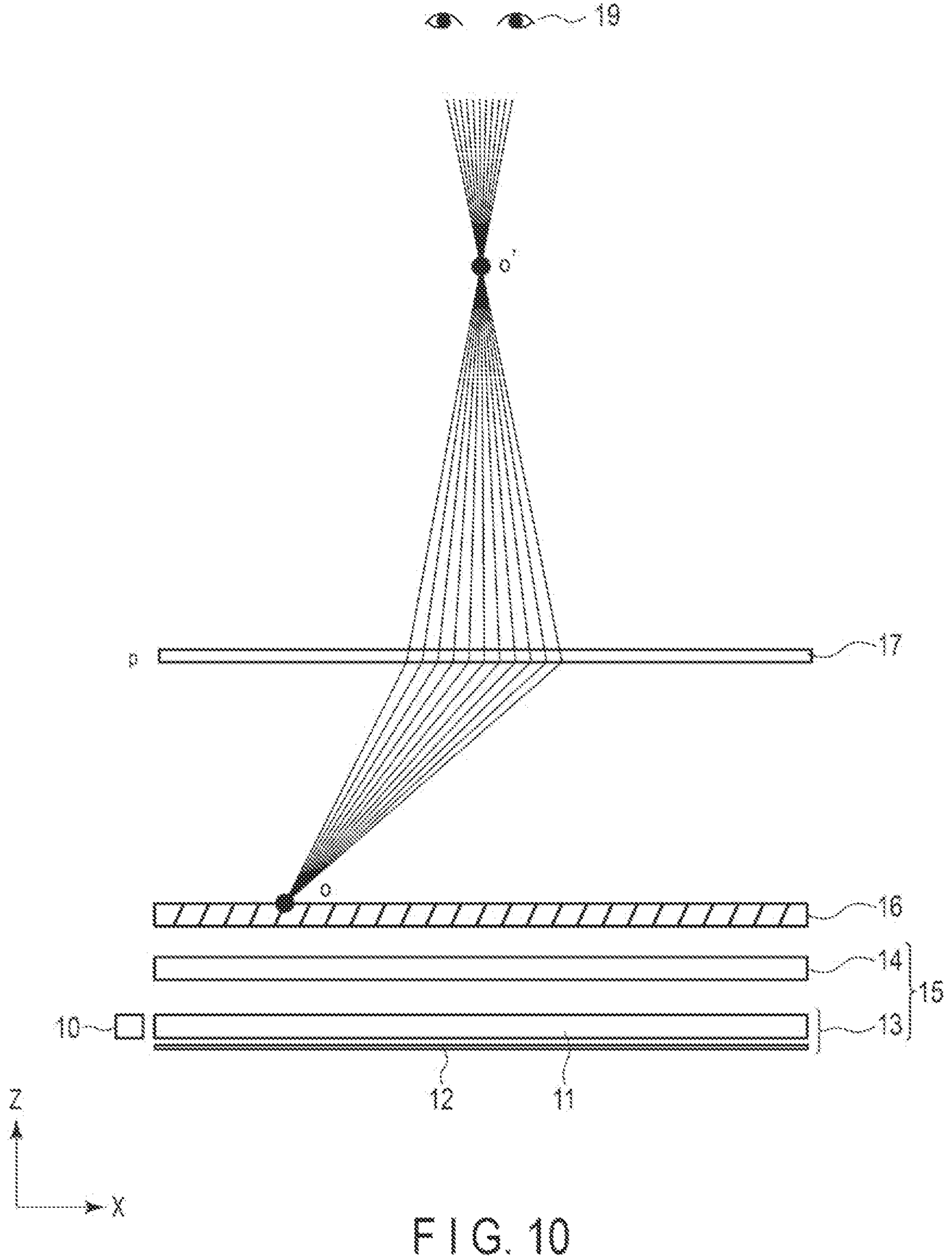
F I G. 10

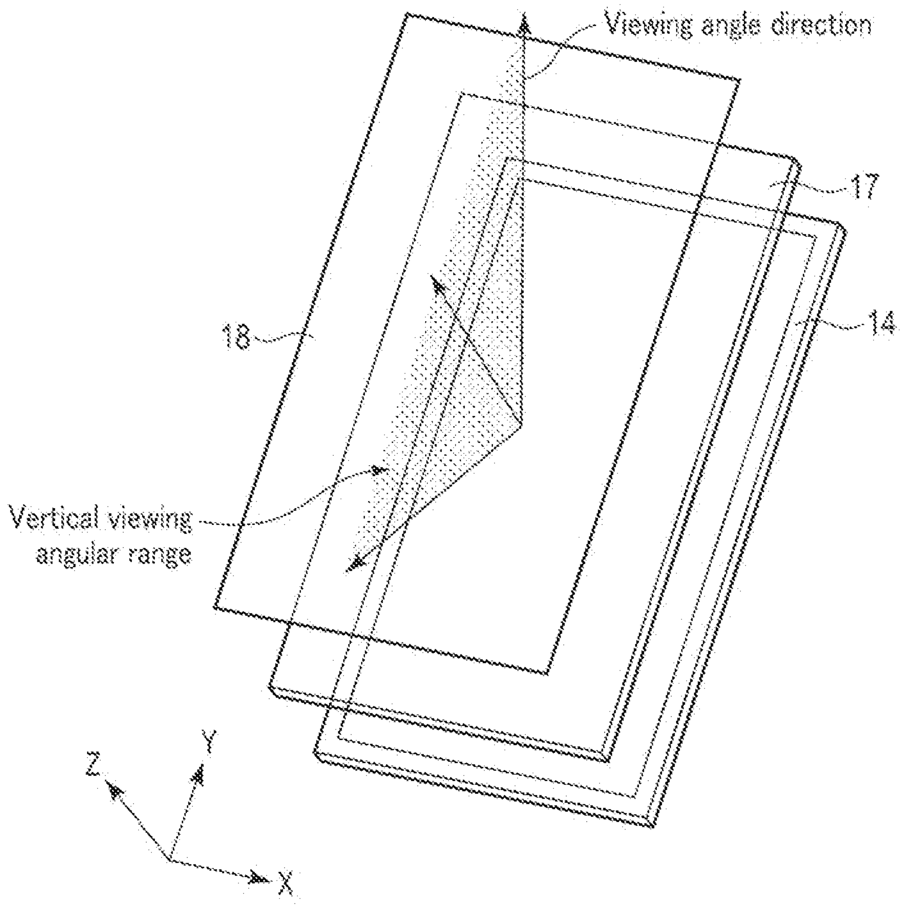
F I G. 14

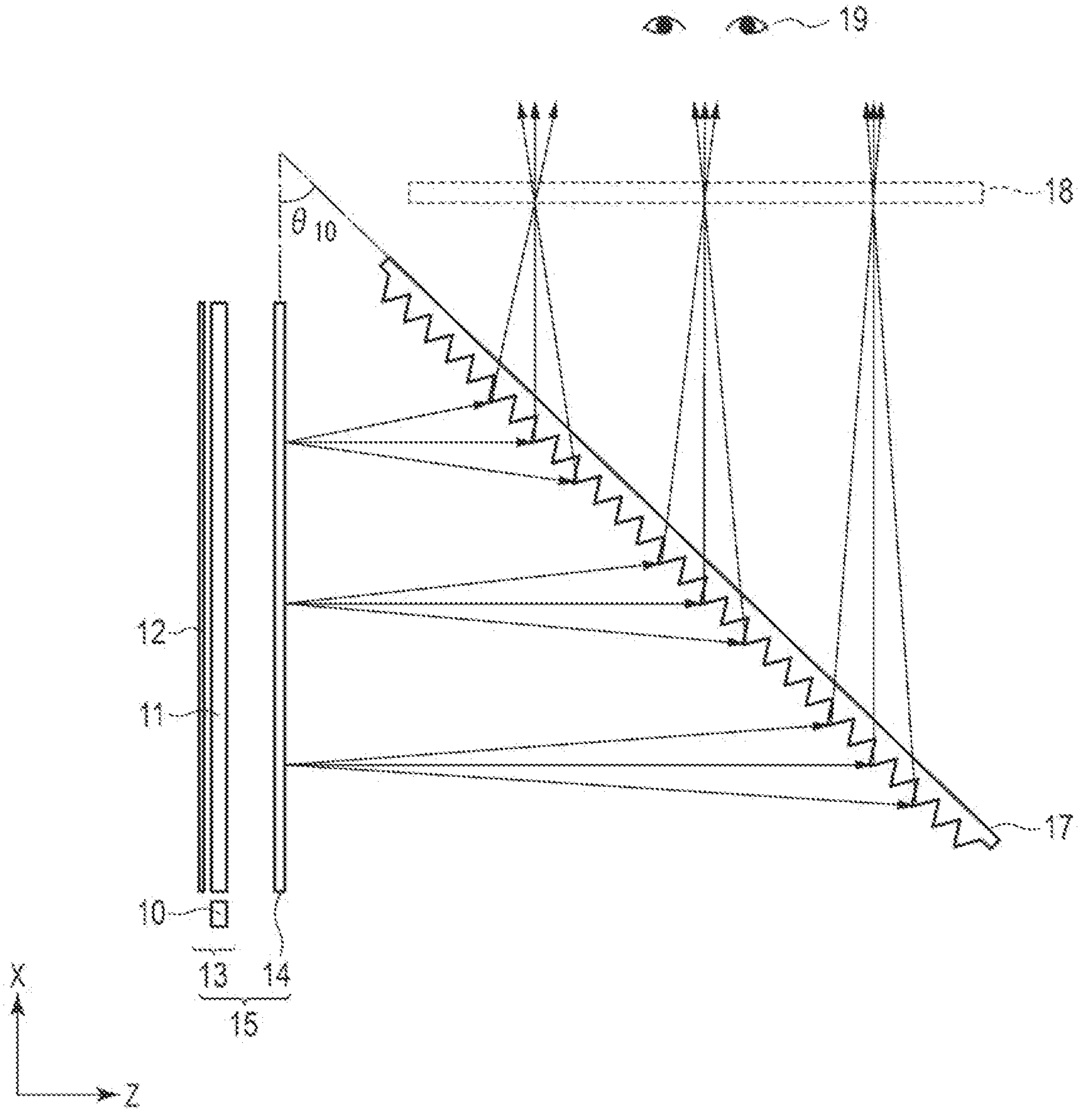
F I G. 18

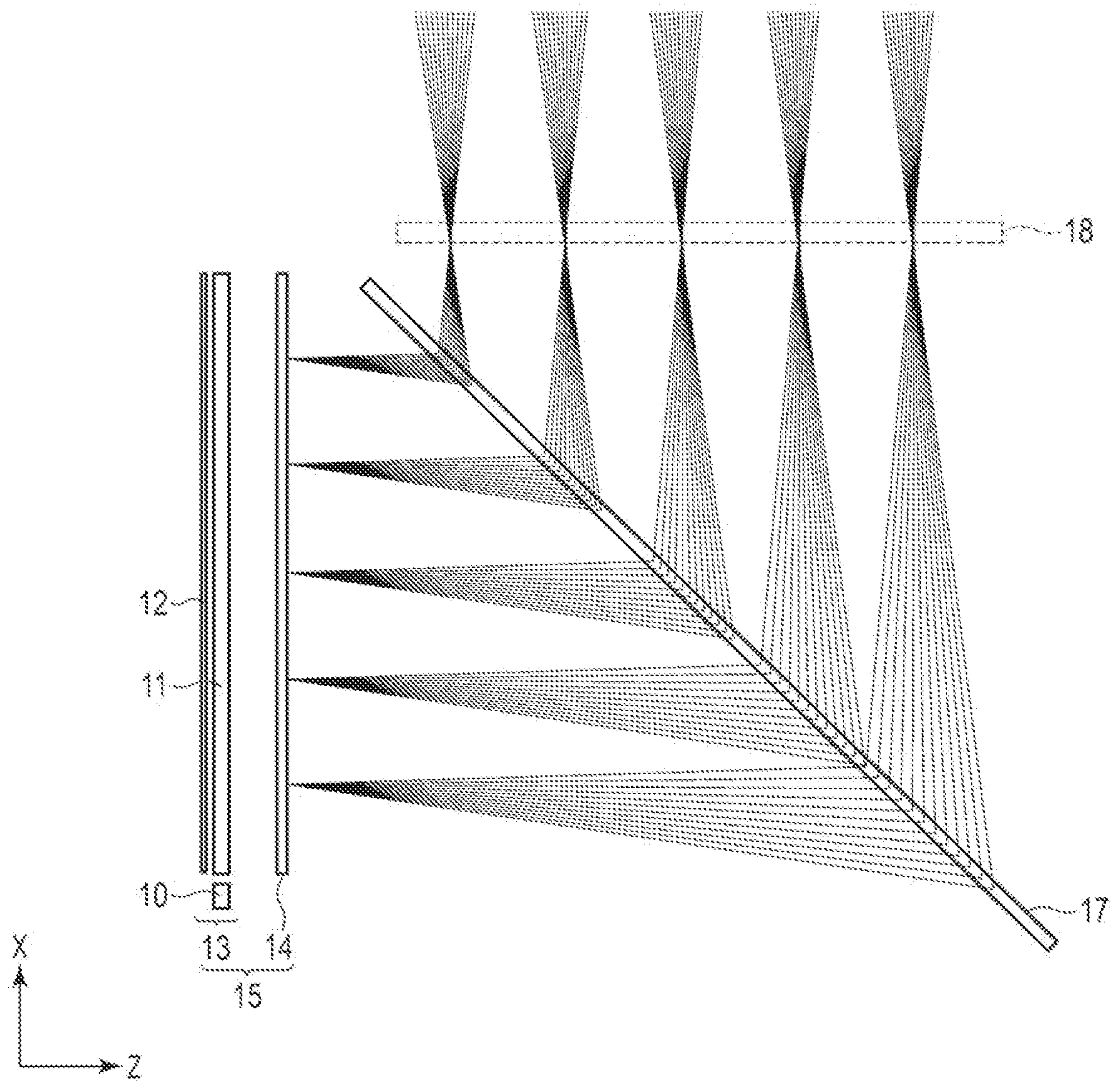
F I G. 19

OPTICAL DEVICE FOR AERIAL DISPLAY APPARATUS, AND AERIAL DISPLAY APPARATUS

CROSS-REFERENCE TO RELATED APPLICATIONS

This application is a Continuation Application of PCT Application No. PCT/JP2022/027381, filed Jul. 12, 2022, and based upon and claiming the benefit of priority from Japanese Patent Applications No. 2021-114801, filed Jul. 12, 2021; and No. 2022-093210, filed Jun. 8, 2022; and, the entire contents of all of which are incorporated herein by reference.

FIELD

The present invention relates to an optical device for an aerial display apparatus and also to an aerial display apparatus.

BACKGROUND

Aerial display apparatuses capable of displaying still images, moving images, and the like as aerial images have been developed, and are expected to serve as new human-machine interfaces. For instance, an aerial display apparatus configured to reflect light emitted from the display surface of a display device and form a real image in the air by using a dihedral corner reflector array, in which dihedral corner reflectors are arranged into an array, has been proposed. With the display method adopting a dihedral corner reflector array, a real image (aerial image) can be displayed at a plane-symmetric position without an aberration.

Patent Document 1 (Jpn. Pat. Appln. KOKAI Publication No. 2011-191404) discloses an optical device using transparent quadrangular prisms that protrude from the surface of a flat transparent plate as dihedral corner reflectors, in which the quadrangular prisms are arranged into an array on a plane. Patent Document 2 (Jpn. Pat. Appln. KOKAI Publication No. 2011-175297) discloses an optical device in which first and second light control panels, each of which is formed by vertically aligning a plurality of planar light reflecting portions inside a flat transparent plate, are arranged in such a manner that the planar light reflecting portions of the two panels are orthogonal to each other. In the optical devices disclosed in Patent Documents 1 and 2, the light emitted from the display device is reflected twice upon the orthogonally arranged reflection surfaces to generate an aerial image.

On display devices adopting the optical device of Patent Document 1 or 2, one can recognize an aerial display image through an observation from an oblique direction of the optical device. It is difficult, however, to clearly recognize an aerial display image when observed from the direction of the normal to the optical device.

SUMMARY

A first aspect of the present invention provides an aerial display apparatus comprising: a display device configured to display an image; and an optical device arranged to receive light from the display device and reflecting the light from the display device to a side opposite to the display device, wherein the optical device includes a planar base member, and a plurality of optical elements provided below the base member as viewed from a viewer, each extending in a first direction and aligned in a second direction orthogonal to the first direction, each of the optical elements has an incident surface and a reflection surface which are inclined with respect to a normal direction of the base member and are in contact with each other, and the optical device is arranged in such a manner as to be capable of receiving, on the incident surface, light that is included in the light from the display device and contributes to image formation, and the optical device is configured to form an aerial image in an aerial space on the side opposite to the display device.

A second aspect of the present invention provides the aerial display apparatus according to the first aspect, wherein an angle of the reflection surface with respect to the normal direction of the base member is set such that an incident angle of light incident on the reflection surface is larger than a critical angle.

A third aspect of the present invention provides the aerial display apparatus according to the first aspect, wherein an angle of the incident surface with respect to the normal direction of the base member is set such that an incident angle of light incident on the incident surface is smaller than a critical angle.

A fourth aspect of the present invention provides the aerial display apparatus according to the first aspect, wherein the optical device forms an aerial image at a position parallel to the optical device.

A fifth aspect of the present invention provides the aerial display apparatus according to the first aspect, wherein the display device and the optical device are arranged in parallel to each other.

A sixth aspect of the present invention provides the aerial display apparatus according to the first aspect, wherein the display device and the optical device are arranged obliquely with respect to each other.

A seventh aspect of the present invention provides the aerial display apparatus according to the first aspect, further comprising: a light control device arranged between the display device and the optical device and transmitting part of the light from the display device.

An eighth aspect of the present invention provides the aerial display apparatus according to the seventh aspect, wherein the light control device includes a plurality of transparent members and a plurality of light shielding members which are alternately arranged, and the light shielding members are inclined with respect to a normal direction of the light control device.

BRIEF DESCRIPTION OF THE DRAWINGS

FIG. 3A is a plan view of a light control device.

FIG. 3B is a cross-sectional view of the light control device taken along line A-A' of FIG. 3A.

FIG. 10 is a ray tracing diagram of the aerial display apparatus.

FIG. 14 is a perspective view illustrating a viewing angle of the aerial display apparatus.

FIG. 18 is a side view of the aerial display apparatus.

FIG. 19 is a ray tracing diagram of the aerial display apparatus.

DETAILED DESCRIPTION

Figure 1:
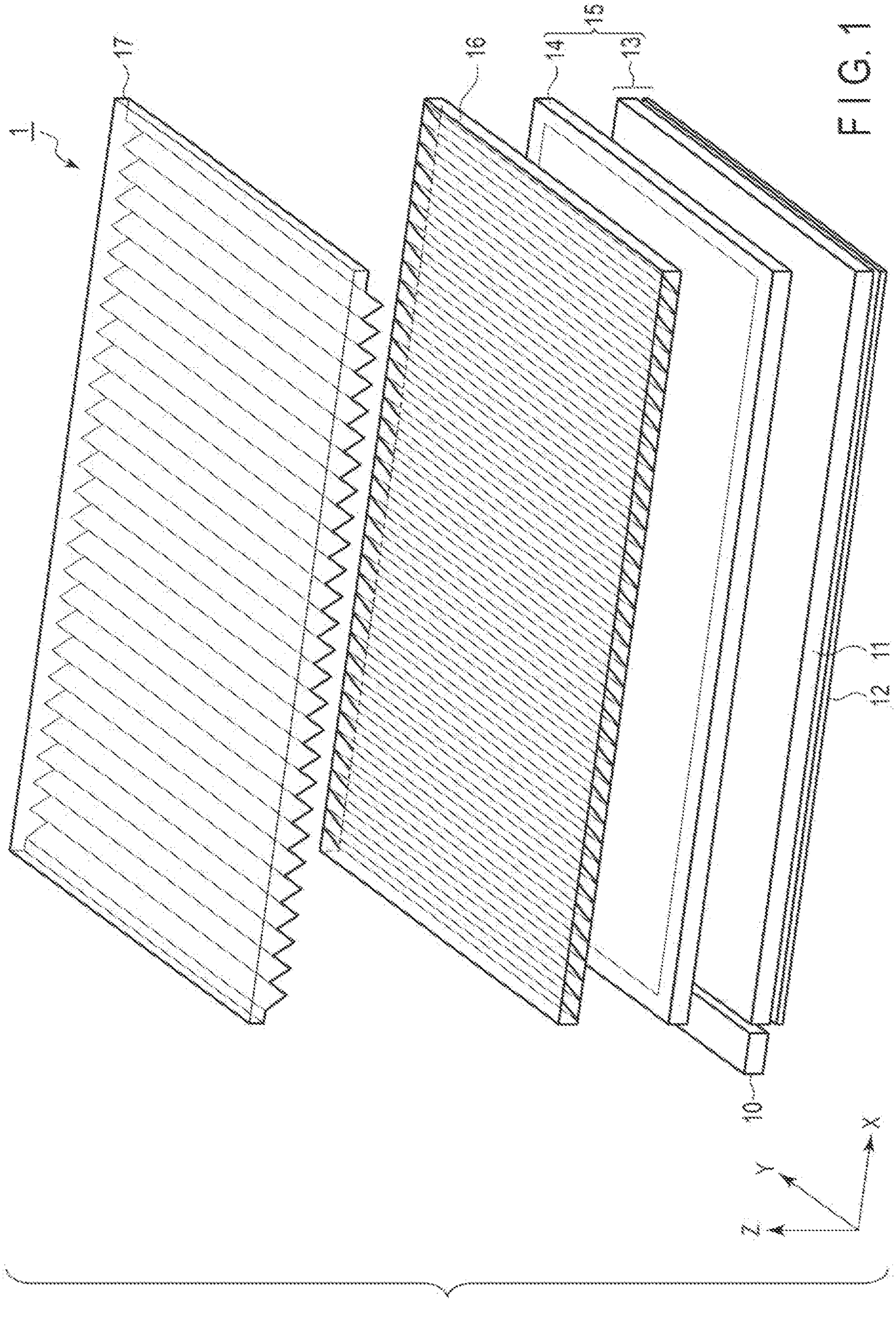
FIG. 1 is a perspective view of an aerial display apparatus according to the first embodiment of the present invention.

Embodiments will be described below with reference to the drawings. These drawings are schematically or conceptually illustrated, and the dimensions, ratios, and the like in each drawing may not always be the same as actual dimensions and ratios. Further, among the drawings illustrating the same portion, the dimensional relationships or ratios may differ from each other. In particular, the embodiments described below exemplify a device and a method that embody the technical idea of the present invention, and therefore the technical idea of the present invention should not be identified by the shape, configuration, arrangement, etc. of the structural components. In the description below, the same reference numerals are given to elements having the same functions and configurations, and redundant explanations may be omitted.

(1) First Embodiment

(1-1) Configuration of Aerial Display Apparatus 1

Figure 2:
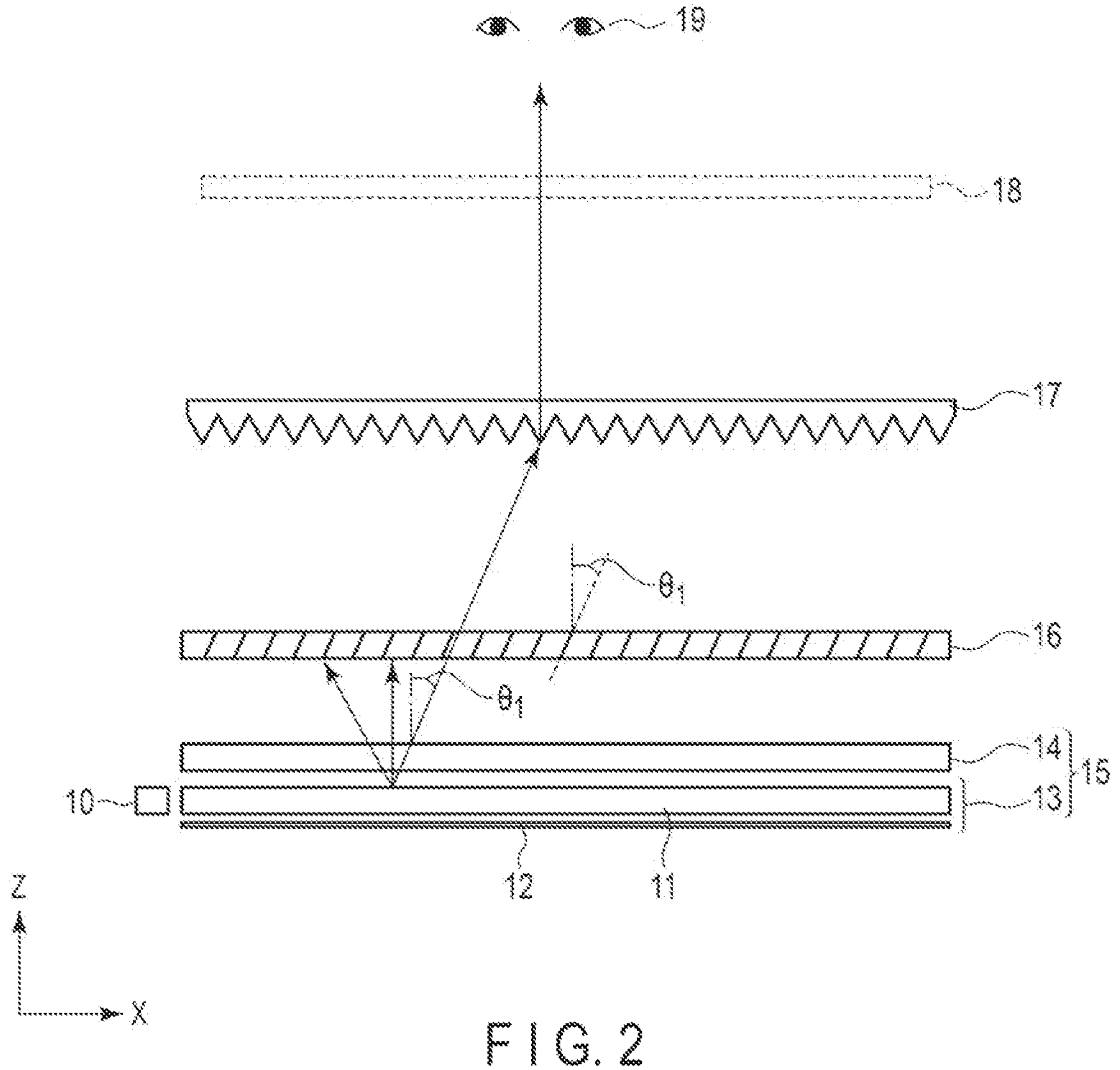
FIG. 2 is a side view of the aerial display apparatus.

FIG. 1 is a perspective view of an aerial display apparatus 1 according to the first embodiment of the present invention. FIG. 2 is a side view of the aerial display apparatus 1. The arrows in FIG. 2 represent optical paths. In FIG. 1, the X direction represents a direction along one side of the aerial display apparatus 1, the Y direction represents a direction orthogonal to the X direction on a horizontal plane, and the Z direction represents a direction orthogonal to the XY plane (also referred to as a normal direction).

The aerial display apparatus 1 denotes an apparatus that displays images (including moving images). The aerial display apparatus 1 displays an aerial image in an aerial space above the light emitting surface of the apparatus itself. The light emitting surface of the aerial display apparatus 1 denotes an upper surface of a component disposed in the uppermost layer of multiple components that constitute the aerial display apparatus 1. An aerial image denotes a real image formed in the aerial space. The aerial display apparatus 1 includes a display apparatus 15, a light control device 16, and an optical device 17.

The display apparatus 15, the light control device 16, and the optical device 17 are arranged in this order in parallel to each other. The display apparatus 15, the light control device 16, and the optical device 17 are secured at the positions indicated in FIG. 1 by support members that are not shown. The display apparatus 15, the light control device 16, and the optical device 17 may be accommodated, for example, in a housing that is not shown.

The display apparatus 15 displays an image on a display surface. In the present embodiment, the display apparatus 15 that is configured by a liquid crystal display device will be described as an example. The display apparatus 15 includes a lighting device (also referred to as a backlight) 13 and a display device 14.

The lighting device 13 produces illumination light and outputs the illumination light toward the display device 14. The lighting device 13 includes a light source unit 10, a light guide plate 11, and a reflective sheet 12. The lighting device 13 may be a sidelight-type lighting device. The lighting device 13 forms a surface light source.

The light source unit 10 produces illumination light. The light source unit 10 is disposed so as to face the side surface of the light guide plate 11 and outputs the illumination light toward the side surface of the light guide plate 11. The light source unit 10 includes, for example, a plurality of light emitting elements (not illustrated) arranged in the Y direction. The light emitting element is configured by a white light emitting diode (LED). The light guide plate 11 guides the illumination light from the light source unit 10 and outputs the illumination light from the upper surface thereof. The reflective sheet 12 reflects the illumination light output from the bottom surface of the light guide plate 11 toward the light guide plate 11 again.

The display device 14 is configured by a transmissive liquid crystal display device. The driving mode of the display device 14 is not particularly limited, and a twisted nematic (TN) mode, a vertical alignment (VA) mode, a homogeneous mode, or the like, can be used. The display device 14 receives the illumination light output from the lighting device 13. The display device 14 transmits the illumination light and performs optical modulation. The display device 14 thereby displays a desired image on its display surface.

The light control device 16 has a function of allowing light components within a predetermined angular range defined around an oblique direction with respect to the normal direction while shielding light components other than the angular range. The area of the light control device 16 is determined to be substantially the same as that of the display device 14. The specific configuration of the light control device 16 will be described later.

The optical device 17 reflects light incident from the bottom surface side to the upper surface side. The optical device 17 may also reflect the light obliquely incident from the bottom surface side, for example, in the front direction (normal direction). The optical device 17 forms an aerial image 18 in the aerial space above the aerial display apparatus 1. The aerial image 18 is a two-dimensional image formed at a position (on a parallel surface) parallel to the device surface of the optical device 17. The device surface denotes a virtual plane on which the optical device 17 extends in an in-plane direction. The device surface has the same meaning as an in-plane direction of the device. The same applies to the device surfaces of other devices. A viewer 19 in front of the optical device 17 can visually recognize the aerial image 18. The area of the optical device 17 is determined to be equal to or larger than that of the display device 14.

(1-1-1) Configuration of Light Control Device 16

FIG. 3A is a plan view of the light control device 16. FIG. 3B is a cross-sectional view of the light control device 16 taken along line A-A' of FIG. 3A.

Base members 21 and 22 are each formed to be a quadrangular plane. A plurality of transparent members 23 are provided on the base member 21 and aligned in the X direction, each extending in the Y direction. A plurality of light shielding members 24 are also provided on the base member 21 and aligned in the X direction, each extending in the Y direction. The transparent members 23 and the light shielding members 24 are alternately arranged in such a manner that adjacent ones are in contact with each other. The base member 22 is provided on the transparent members 23 and the light shielding members 24.

The transparent members 23 respectively extend on the XZ plane in an oblique direction at an angle $\theta_1$ with respect to the normal direction of the base member 21. Each of the transparent members 23 has a parallelogram shape with its side surface inclined at the angle $\theta_1$ on the XZ plane. The transparent members 23 transmit light.

The light shielding members 24 respectively extend on the XZ plane in an oblique direction at the angle $\theta_1$ with respect to the normal direction of the base member 21. Each of the light shielding members 24 has a parallelogram shape with its side surface inclined at the angle $\theta_1$ on the XZ plane. The light shielding member 24 shields light.

Any two adjacent light shielding members 24 are disposed in such a manner that the end portions thereof slightly overlap each other in the Z direction.

The base members 21 and 22 and the transparent members 23 are formed of a transparent resin. The transparent resin includes an acrylic resin. The light shielding members 24 formed of, for example, a resin mixed with a black colorant.

The light control device 16 may be configured without one or both of the base members 21 and 22. The function of the light control device 16 can be realized at least with the transparent members 23 and the light shielding members 24 alternately arranged.

The light control device 16 configured as described above transmits the display light in such a manner that the light intensity in an oblique direction at the angle $\theta_1$ with respect to the normal direction reaches its peak. The light control device 16 is configured, for example, to block light components other than the range of 30°±30° with respect to the normal direction. It is more preferable that the light control device 16 is configured to block light components other than the range of 30°±20° with respect to the normal direction.

(1-1-2) Configuration of Optical Device 17

Figure 4:
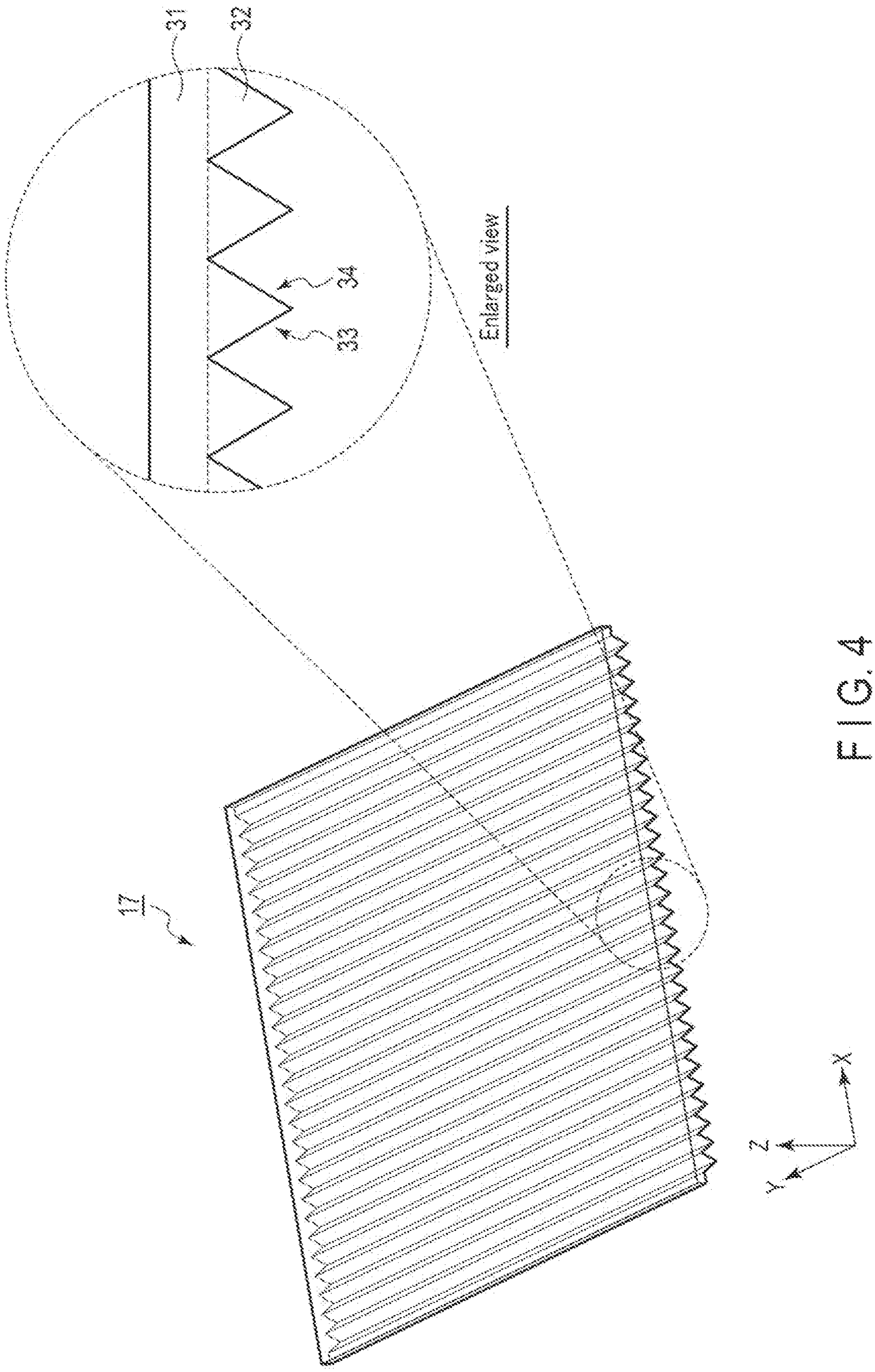
FIG. 4 is a perspective view and a partially enlarged view of an optical device.

FIG. 4 is a perspective view and a partially enlarged view of the optical device 17. The partially enlarged view of FIG. 4 is an enlargement of the XZ plane.

The optical device 17 includes a base member 31 and a plurality of optical elements 32. The base member 31 is formed to be planar on the XY plane and has a rectangular parallelepiped shape.

A plurality of optical elements 32 are provided on the bottom surface of the base member 31. Each of the optical elements 32 is formed to be a triangular prism. The optical elements 32 are disposed such that the three side surfaces of each triangular prism extend parallel to the XY plane with one of the side surfaces being in contact with the base member 31. The optical elements 32 each extend in the Y direction and are aligned in the X direction. In other words, the optical elements 32 form a sawtooth shape.

Each optical element 32 has an incident surface 33 and a reflection surface 34. Upon the incident surface 33, light from the light control device 16 is incident. Upon the reflection surface 34, the light externally incident on the incident surface 33 is reflected in the interior of the optical element 32.

The optical elements 32 may be formed integrally with the base member 31, using the same transparent material as the base member 31. The base member 31 and the optical elements 32 may be formed separately, and the optical elements 32 may be adhered to the base member 31, using a transparent adhesive. Examples of the transparent material for the base member 31 and the optical elements 32 include an acrylic resin or glass.

The optical device 17 internally reflects incident light and thereby forms a real image in the aerial space. The optical device 17 forms an aerial image at a position in front of its device surface in parallel with the optical device 17.

(1-2) Block Configuration of Aerial Display Apparatus 1

Figure 5:
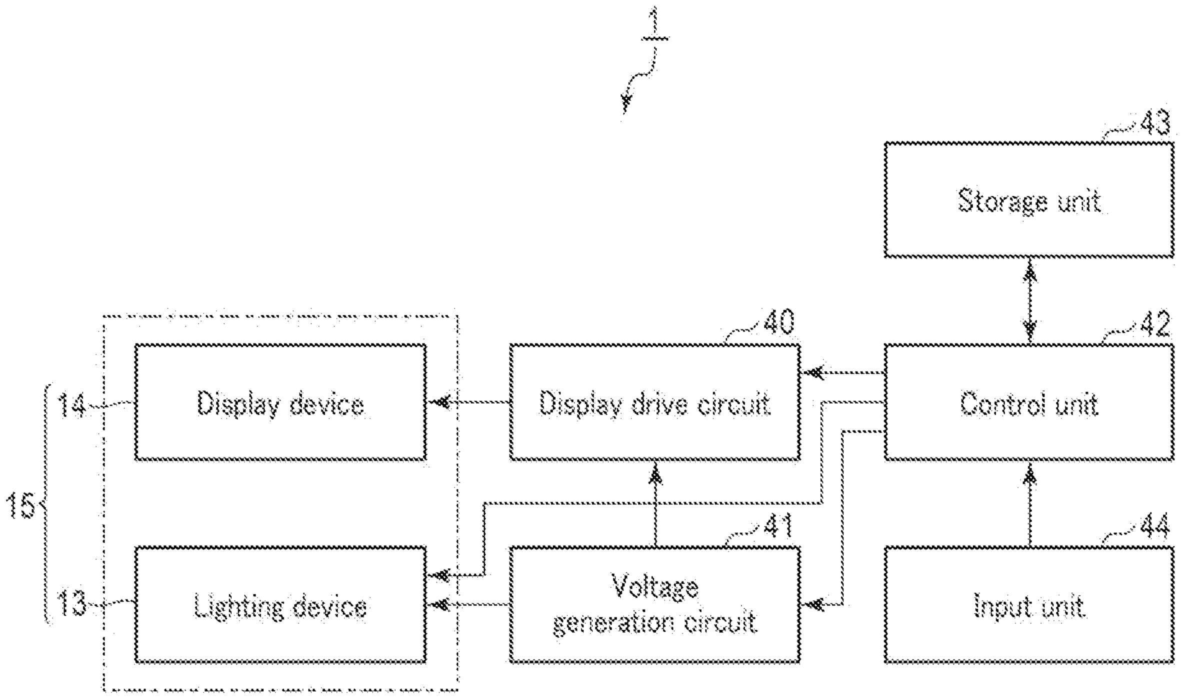
FIG. 5 is a block diagram of the aerial display apparatus.

FIG. 5 is a block diagram of the aerial display apparatus 1. The aerial display apparatus 1 includes a display apparatus 15 (including the lighting device 13 and the display device 14), a display drive circuit 40, a voltage generation circuit 41, a control unit 42, a storage unit 43, and an input unit 44.

The display drive circuit 40 drives the display device 14 to display a still image and/or a moving image on the display device 14. The voltage generation circuit 41 generates various types of voltages necessary for the lighting device 13 and the display drive circuit 40 to operate, and supplies these voltages to the lighting device 13 and the display drive circuit 40.

The control unit 42 controls the overall operation of the aerial display apparatus 1. That is, the control unit 42 controls the operations of the lighting device 13, the display drive circuit 40, and the voltage generation circuit 41. The control unit 42 thereby displays an aerial image 18 at a targeted display position.

The storage unit 43 includes a volatile memory and a nonvolatile memory. The storage unit 43 stores various types of data necessary for the operation of the aerial display apparatus 1. The storage unit 43 further stores data of images displayed by the aerial display apparatus 1.

The input unit 44 receives information input by the user. The input unit 44 sends the information input by the user to the control unit 42. The control unit 42 can select an image to be displayed on the display apparatus 15 based on the information received by the input unit 44.

(1-3) Operation of Aerial Display Apparatus 1

Next, the operation of the aerial display apparatus 1 configured as above will be described.

As shown in FIG. 2, the light emitted from the display apparatus 15 is incident on the light control device 16. In the light emitted from the display apparatus 15, a light component at the angle $\theta_1$ (including light components in a predetermined angular range defined around the angle $\theta_1$) is transmitted through the light control device 16. The light that has been transmitted through the light control device 16 enters the optical device 17. The optical device 17 forms an image of the incident light in the aerial space on the side opposite to the light control device 16 and displays an aerial image 18 in the aerial space.

Figure 6:
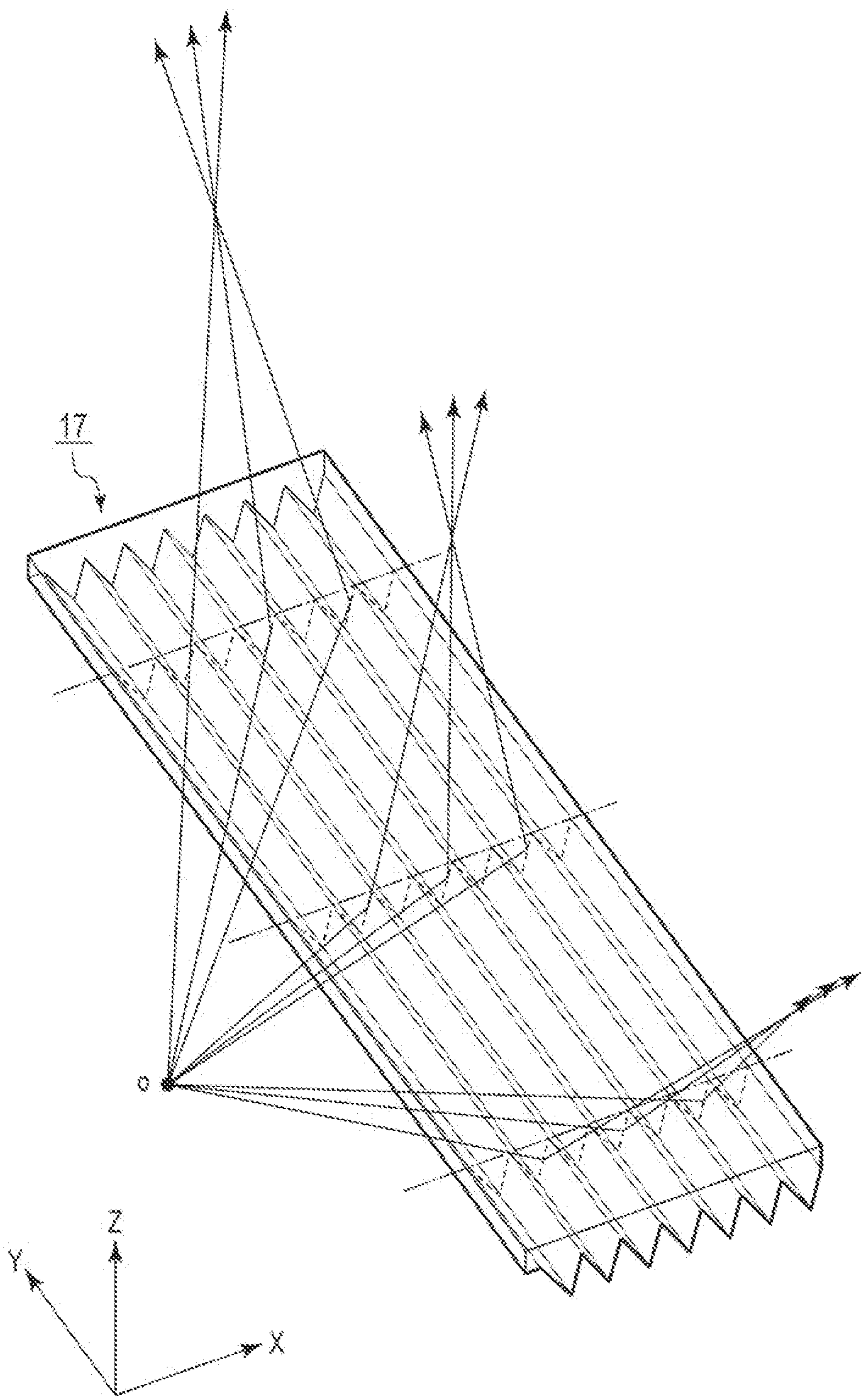
FIG. 6 is a perspective view illustrating the state of light reflection on the optical device.
Figure 7:
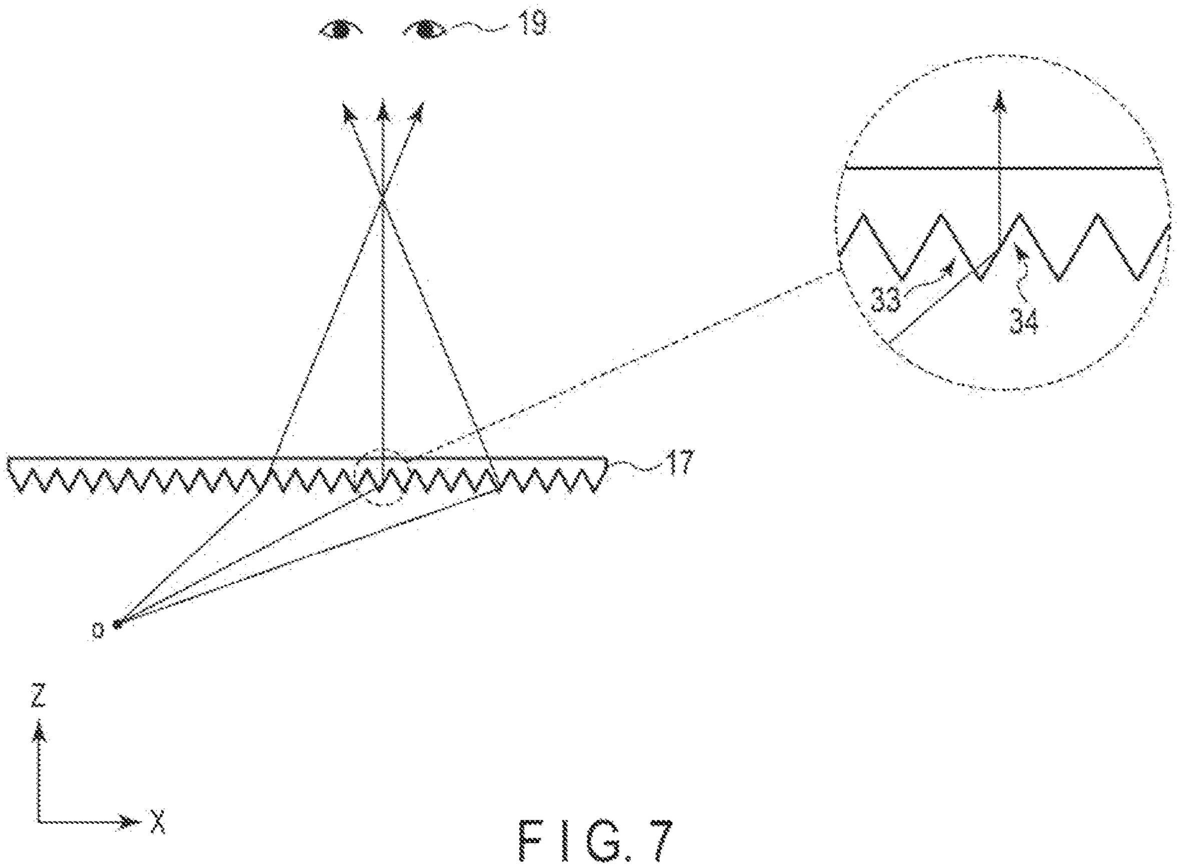
FIG. 7 is an XZ-plane side view illustrating the state of light reflection on the optical device.
Figure 8:
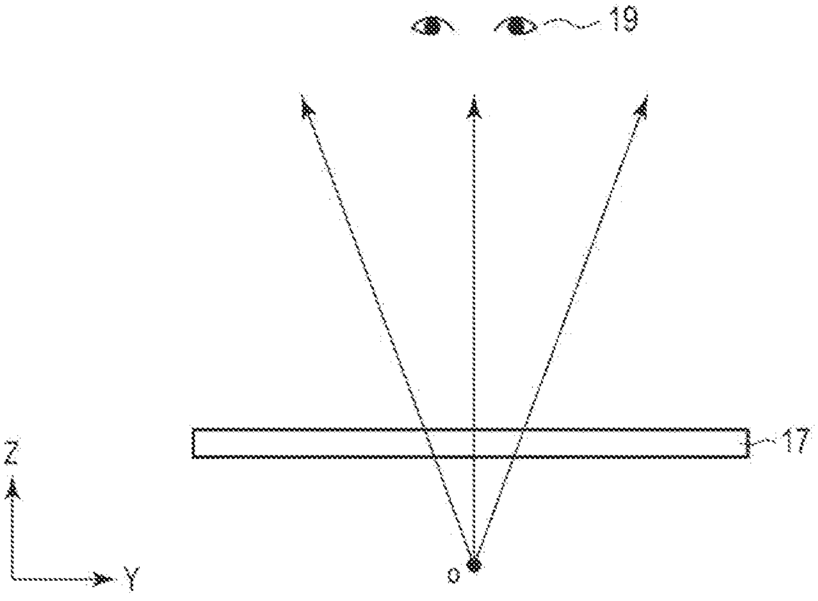
FIG. 8 is a YZ-plane side view illustrating the state of light reflection on the optical device.

FIG. 6 is a perspective view illustrating the state of light reflection on the optical device 17. FIG. 7 is an XZ-plane side view illustrating the state of light reflection on the optical device 17. In FIG. 7, the optical device 17 is viewed with both eyes (i.e., a line connecting both eyes) of the viewer 19 being parallel to the X direction. FIG. 8 is a YZ-plane side view illustrating the state of light reflection on the optical device 17. In FIG. 8, the optical device 17 is viewed with both eyes of the viewer 19 being parallel to the Y direction.

The light emitted from an arbitrary point "o" on the device surface of the light control device 16 enters the incident surfaces 33 of the optical device 17 and reaches the reflection surfaces 34. The light that has reached the reflection surfaces 34 to have an angle larger than the critical angle with respect to the normal direction of the reflection surfaces 34 is totally reflected on the reflection surfaces 34 and is output from the side of the plane of the optical device 17 opposite to the side of the optical elements 32. The critical angle denotes the smallest angle of incidence beyond which total reflection occurs. The critical angle is the angle relative to the normal of the incidence surface.

In the XZ plane of FIG. 7, the light emitted from the point "o" is totally reflected on the reflection surfaces 34 of the optical elements 32. The light produces an aerial image in the aerial space.

In the YZ plane of FIG. 8, the light emitted from the point "o" is not reflected on the reflection surfaces 34 of the optical elements 32, performing no image formation in the aerial space. The light therefore does not contribute to the formation of an aerial image.

That is, the condition under which the viewer 19 can recognize an aerial image is when both eyes of the viewer 19 are parallel to the X direction or approximately parallel (e.g., ±10 degrees with respect to the X direction). Furthermore, in the state of both eyes of the viewer 19 being parallel to or approximately parallel to the X direction, if the viewpoint is shifted along the Y direction, an aerial image can be always recognized.

Figure 9:
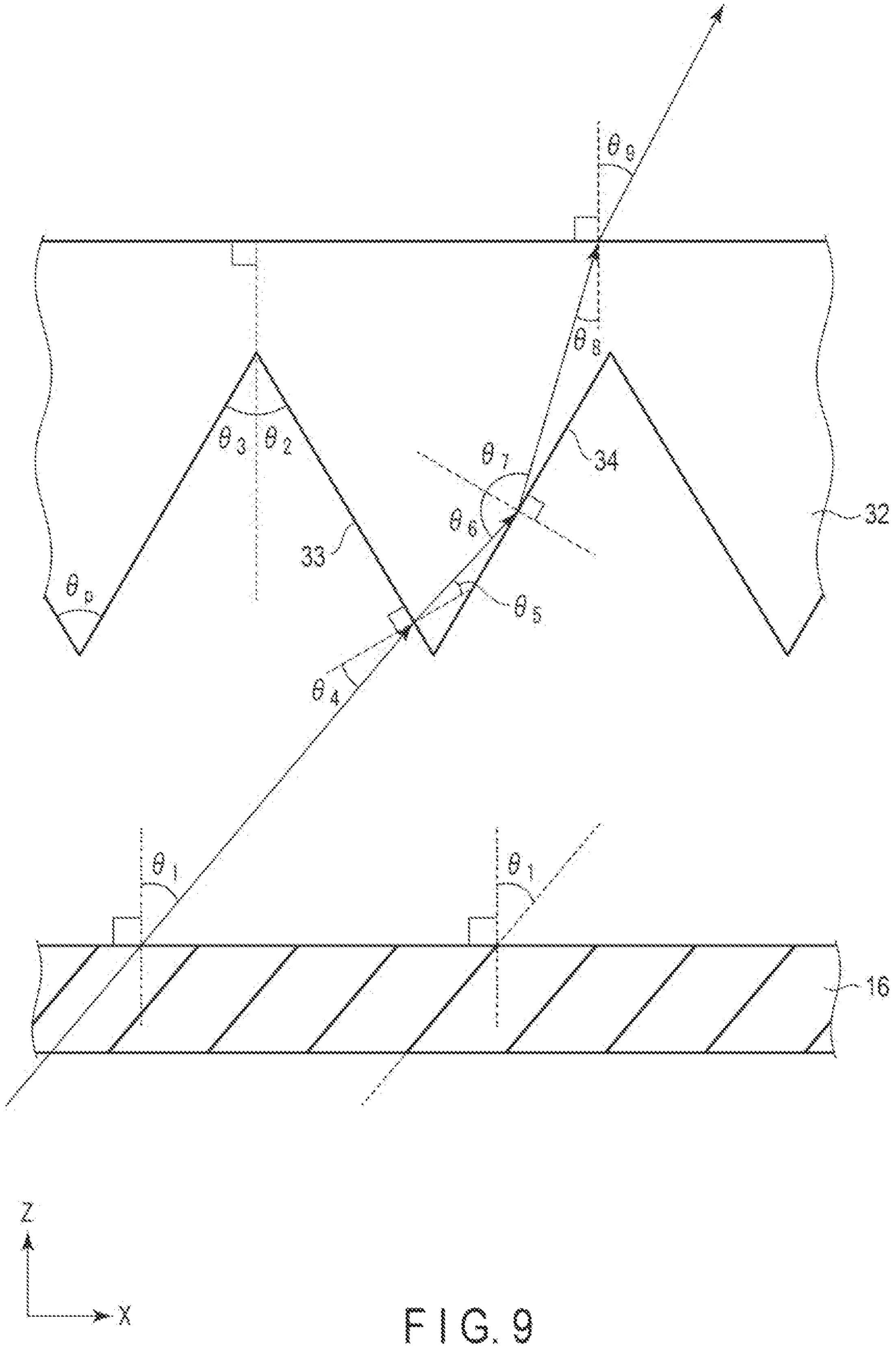
FIG. 9 is a diagram illustrating angular conditions of the incident surface 33 and the reflection surface 34 in the optical device.

FIG. 9 is a diagram illustrating angular conditions of an incident surface 33 and a reflection surface 34 of the optical device 17.

When the angle of the incident surface 33 with respect to the Z direction (the direction perpendicular to the device surface) is $\theta_2$, the angle of the reflection surface 34 with respect to the Z direction is $\theta_3$, and the angle between the incident surface 33 and the reflection surface 34 is $\theta_p$, the angle $\theta_p$ is expressed by the following equation (1):

$$\theta_p=\theta_2+\theta_3 \quad (1)$$

The light emitted from the light control device 16 at the angle $\theta_1$ is incident on the incident surfaces 33. It is assumed that the refractive index of the material of the optical device 17 is $n_p$, and the refractive index of air is 1. On the incident surface 33, the incident angle is $\theta_4$, and the refraction angle is $\theta_5$. On the reflection surface 34, the incident angle is $\theta_6$, and the reflection angle is $\theta_7$ ($=\theta_6$). The incident angle on the upper surface of the light control device 16 is $\theta_2$, and the refraction angle thereon is $\theta_9$. The refraction angle $\theta_9$ is the output angle. The output angle $\theta_9$ can be expressed by the following equation (2):

$$\theta_9=\sin^{-1}(n_p*\sin(\sin^{-1}((1/n_p)*\sin(90°-(\theta_1+\theta_2)))+\theta_2+2\theta_3-90°)) \quad (2)$$

The critical angle of the reflection surface 34 can be expressed by the following equation (3):

$$\text{Critical angle}<\theta_6(=\theta_7)$$

$$\text{Critical angle}=\sin^{-1}(1/n_p) \quad (3)$$

In other words, the incident angle $\theta_6$ on the reflection surface 34 is set to be larger than the critical angle on the reflection surface 34. In other words, the angle $\theta_3$ of the reflection surface 34 is determined such that the incident angle of the light incident on the reflection surface 34 is larger than the critical angle.

The light incident on the incident surface 33 is set so as to cause no total reflection on the incident surface 33. That is, the angle $\theta_2$ of the incident surface 33 is determined such that the incident angle of the light incident on the incident surface 33 is smaller than the critical angle.

The angle between the device surface of the optical device 17 and the plane of the aerial image 18 and the distance between the device surface of the optical device 17 and the plane of the aerial image 18 can be adjusted by optimally setting the angle $\theta_1$ of the light incident on the optical device 17, the refractive index of the optical device 17, the angle $\theta_2$ of the incident surface 33 of the optical device 17, and the angle $\theta_3$ of the reflection surface 34 of the optical device 17.

FIG. 10 is a ray tracing diagram of the aerial display apparatus 1. The parameters in FIG. 10 are $\theta_1$=35°, $\theta_3$=22.5°, and $\theta_p$=45°.

The light emitted from the point "o" located on the device surface of the light control device 16 forms an image at a point "o'". If the optical device 17 is considered to be a surface "p", "op:o'p≈1:2" is secured.

Figure 11:
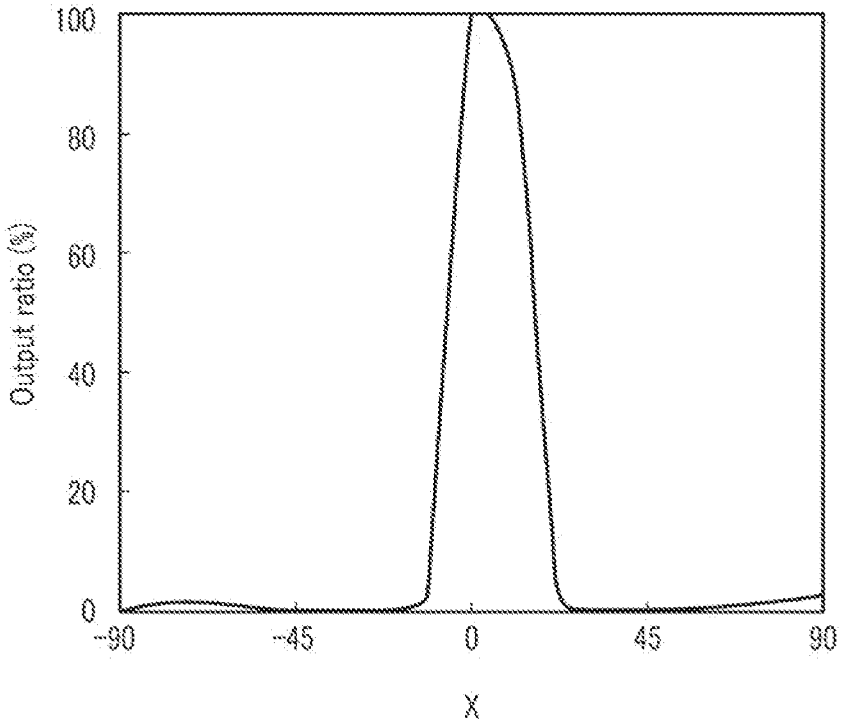
FIG. 11 is a chart of light distribution in the X direction in the aerial display apparatus.

FIG. 11 is a chart of light distribution in the X direction in the aerial display apparatus 1. The waveform of FIG. 11 corresponds to the parameters in FIG. 10. The horizontal axis of FIG. 11 represents the angle (in degrees) at which the viewer observes the optical device 17 along the X direction, and the vertical axis represents the light output ratio (in percentage). FIG. 11 demonstrates a large output ratio at 0 degrees, or in other words, when viewed from the front direction. The viewer can visually recognize the aerial image most clearly in an observation from the front direction.

Figure 12:
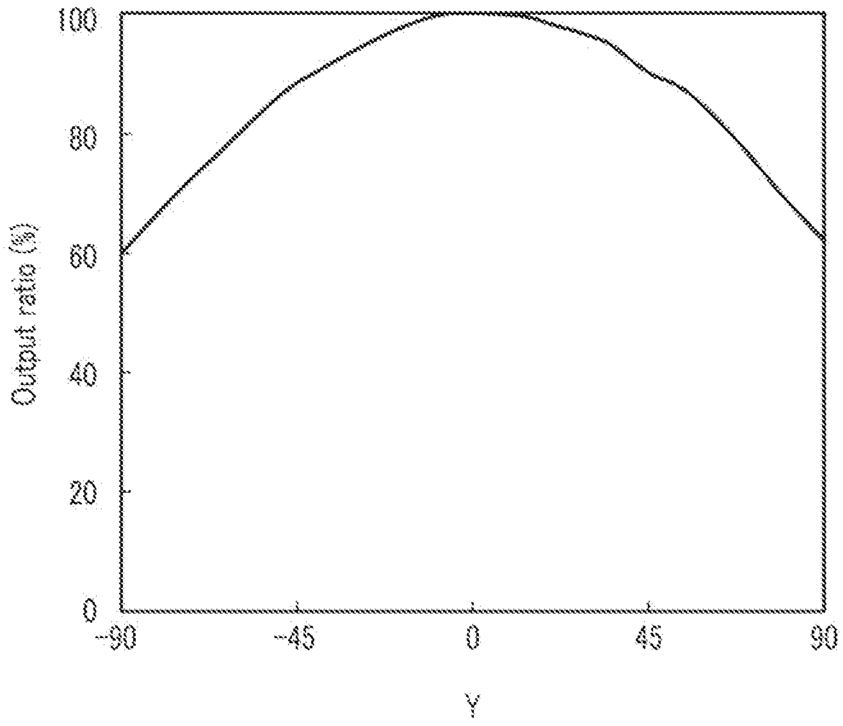
FIG. 12 is a chart of light distribution in the Y direction in the aerial display apparatus.

FIG. 12 is a chart of light distribution in the Y direction in the aerial display apparatus 1. The waveform of FIG. 12 corresponds to the parameters of FIG. 10. The horizontal axis of FIG. 12 represents the angle (in degrees) at which the viewer observes the optical device 17 along the Y direction, and the vertical axis represents the light output ratio (in percentage). FIG. 12 demonstrates that, when the aerial display apparatus 1 is viewed along the Y direction, the light emitted from the display apparatus 15 is transmitted through the optical device 17, without forming an aerial image.

Figure 13:
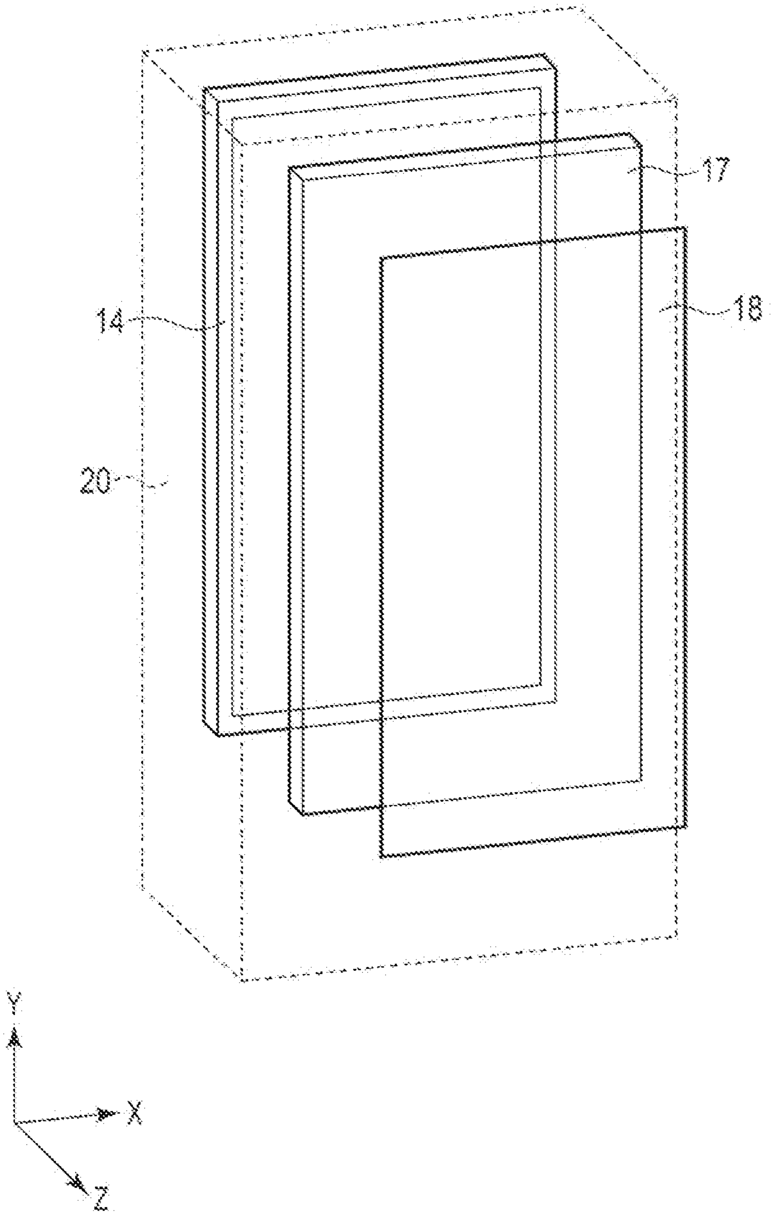
FIG. 13 is a perspective view illustrating the configuration of the overall aerial display apparatus.

FIG. 13 is a perspective view illustrating the configuration of the overall aerial display apparatus 1.

The aerial display apparatus 1 includes a housing 20, which has a box shape with a bottom plate and four side plates. The housing 20 accommodates a display apparatus 15 (lighting device 13 and display device 14), a light control device 16, and an optical device 17. The lighting device 13 and the light control device 16 are not shown in FIG. 13. The housing 20 has a quadrangular opening in the upper portion thereof, into which the optical device 17 is fitted.

As shown in FIG. 13, the aerial display apparatus 1 can display an aerial image 18 in the aerial space above the light emitting surface of the aerial display apparatus 1. The aerial display apparatus 1 can also display a two-dimensional aerial image 18 parallel to the device surface of the optical device 17. Furthermore, the aerial display apparatus 1 can be thinned in the Z direction.

FIG. 14 is a perspective view illustrating a viewing angle of the aerial display apparatus 1. In the aerial display apparatus 1, only the display device 14 and the optical device 17 are illustrated in FIG. 14. The arrows in FIG. 14 indicate the viewing angle directions.

The viewer 19 can visually recognize the aerial image 18 in an observation of the aerial display apparatus 1 with both his/her eyes substantially parallel to the X direction. When the viewer 19 shifts his/her viewpoint along the Y direction, the aerial display apparatus 1 realizes a wider viewing angle. The viewing angle is defined by determining the Z direction perpendicular to the device surface of the optical device 17 as 0 degrees. The aerial display apparatus 1 of the present embodiment can realize a viewing angle of about 30 degrees in upward and downward directions on the YZ plane. That is, a vertical viewing angular range of approximately 0±30 degrees can be realized by the aerial display apparatus 1.

Among conventional aerial display apparatuses, an apparatus configured by adopting a dihedral corner reflector array and arranging a display device and the dihedral corner reflector array obliquely with respect to each other (e.g., at 45 degrees) has been known. The conventional aerial display apparatus generally has a viewing angle of about 0 degrees or more and 15 degrees or less from side to side and upward and downward directions. In comparison with the conventional aerial display apparatus, the present embodiment can significantly improve the viewing angle.

(1-4) Modification Examples

Figure 15:
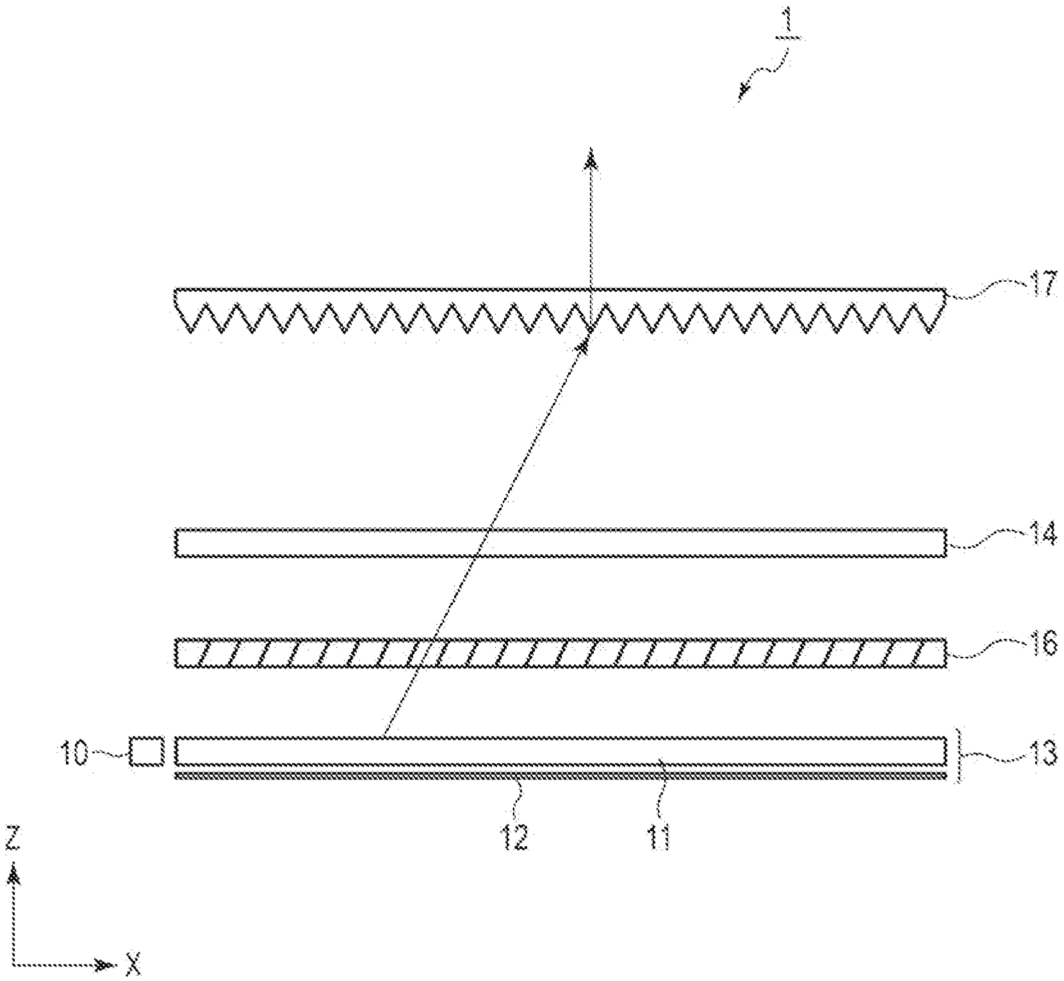
FIG. 15 is a side view of an aerial display apparatus according to the first modification example.

Next, modification examples regarding the position of the light control device 16 will be described. FIG. 15 is a side view of the aerial display apparatus 1 according to the first modification example. The light control device 16 may be disposed between the lighting device 13 and the display device 14.

Figure 16:
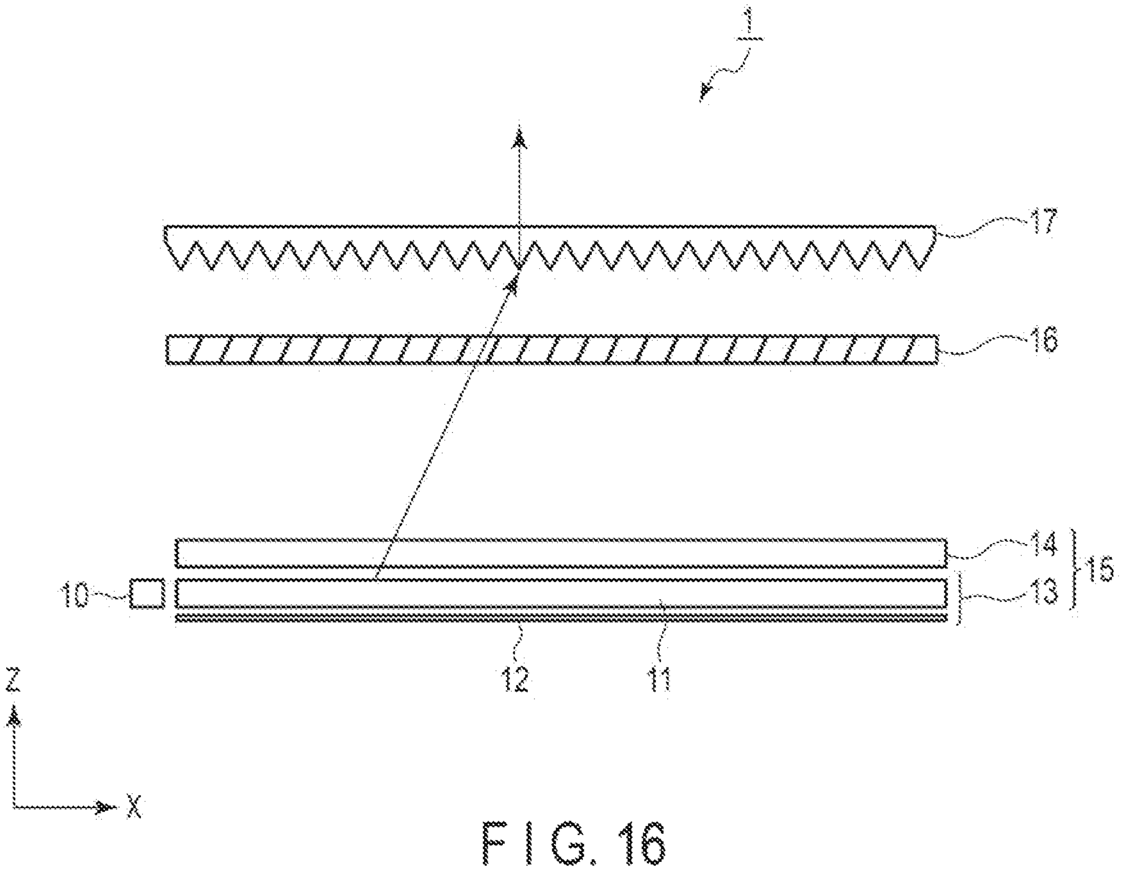
FIG. 16 is a side view of an aerial display apparatus according to the second modification example.

FIG. 16 is a side view of the aerial display apparatus 1 according to the second modification example. The light control device 16 may be disposed closer to the optical device 17.

Alternatively, the aerial display apparatus 1 may be configured without a light control device 16. Even if the aerial display apparatus 1 is configured without a light control device 16, the aerial display apparatus 1 can still display an aerial image in the aerial space.

(1-5) Effects of First Embodiment

According to the first embodiment, an aerial display apparatus 1 capable of displaying an aerial image while securing a high display quality can be realized.

In addition, the viewer 19 can visually recognize an aerial image when observing the optical device 17 in a state of both his/her eyes being parallel to or approximately parallel to the X direction (i.e., the direction of the optical elements 32 being aligned). Furthermore, an aerial image can be continuously recognized when the viewer 19 shifts the viewpoint along the Y direction in a state of both his/her eyes being parallel to or approximately parallel to the X direction. That is, it is possible to secure a viewing angle in a state of both eyes of the viewer 19 being parallel to or approximately parallel to the X direction.

In addition, a plurality of elements constituting the aerial display apparatus 1 can be arranged in parallel. This can realize an aerial display apparatus 1 that is thinned (downsized) in the Z direction.

Moreover, an aerial image can be displayed in the front direction of the aerial display apparatus 1. In addition, a two-dimensional aerial image can be displayed in parallel with the device surface of the optical device 17 configured to produce aerial images.

(2) Second Embodiment

The second embodiment relates to configuration examples in which the display device 14 is disposed obliquely with respect to the optical device 17.

Figure 17:
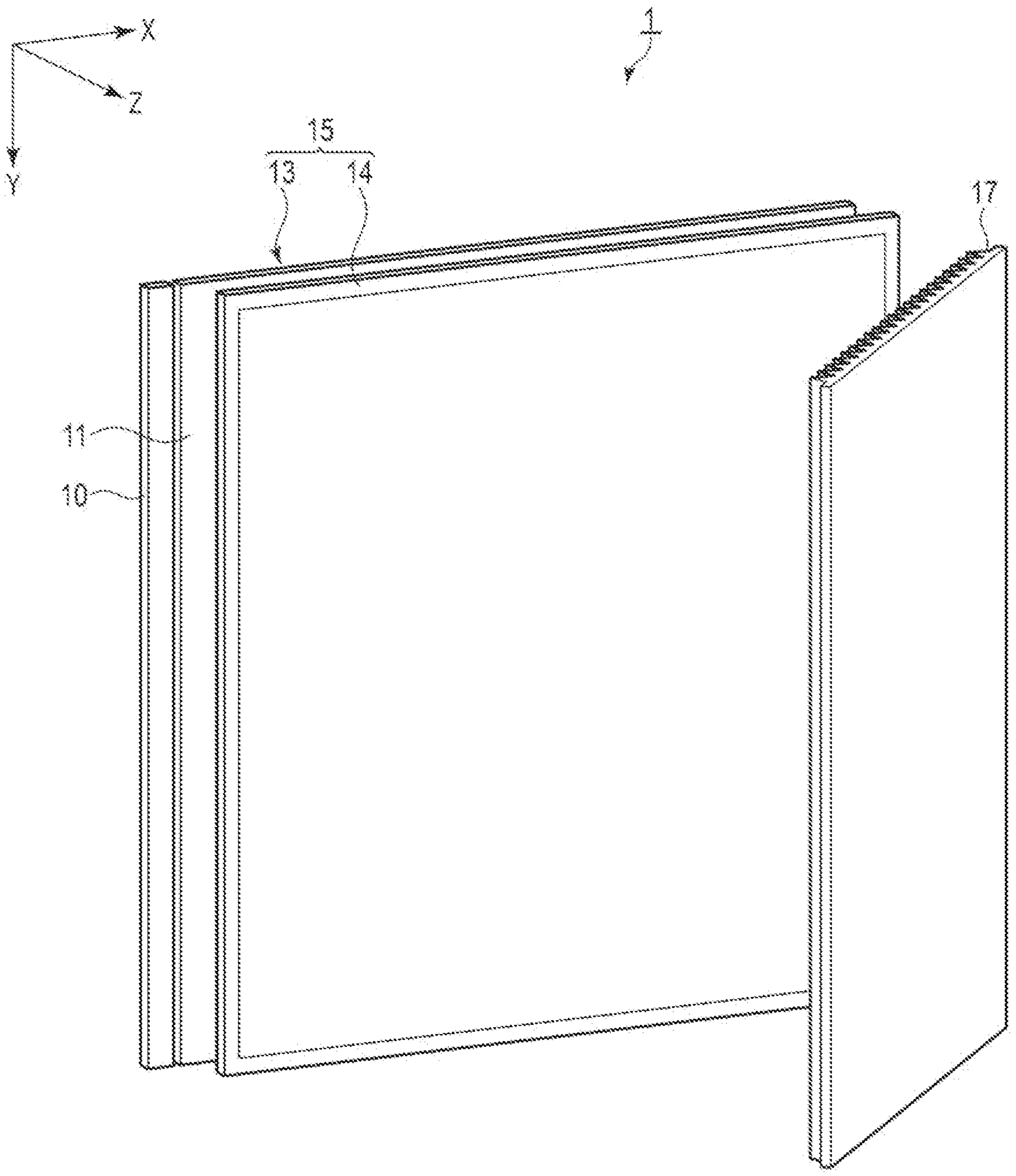
FIG. 17 is a perspective view of an aerial display apparatus according to the second embodiment of the present invention.

FIG. 17 is a perspective view of the aerial display apparatus 1 according to the second embodiment of the present invention. FIG. 18 is a side view of the aerial display apparatus 1. In FIG. 17, the X direction represents a direction along one side of the display apparatus 15, the Y direction represents a direction orthogonal to the X direction on a horizontal plane of the display apparatus 15, and the Z direction represents a direction orthogonal to an XY plane.

The aerial display apparatus 1 includes a display apparatus 15 and an optical device 17. The display apparatus 15 includes a lighting device 13 and a display device 14. The configurations of the display apparatus 15 and the optical device 17 are the same as those in the first embodiment.

The optical device 17 is arranged obliquely at an angle $\theta_{10}$ with respect to the display apparatus 15. In the second embodiment, the angle $\theta_{10}$ may be 40 degrees or larger and 50 degrees or smaller. It is more preferable that the angle $\theta_{10}$ be approximately 45 degrees.

As shown in FIG. 18, the light emitted from the display apparatus 15 is incident on the optical device 17. The optical device 17 reflects the light obliquely incident from the bottom side toward the upper side. For instance, the optical device 17 displays, as an aerial image, the image 18 displayed on the display apparatus 15, at a plane-symmetrical position with respect to the optical device 17 serving as a plane of symmetry. The viewer 19 positioned in an oblique direction at an angle $\theta_{10}$ with respect to the normal direction of the optical device 17 can visually recognize the aerial image 18.

The angle between the device surface of the optical device 17 and the plane of the aerial image 18 and the distance between the device surface of the optical device 17 and the plane of the aerial image 18 can be adjusted by optimally setting the angle $\theta_{10}$ between the display apparatus 15 and the optical device 17, the refractive index of the optical device 17, the angle $\theta_2$ of the incident surface 33 of the optical device 17, and the angle $\theta_3$ of the reflection surface 34 of the optical device 17. The aerial display apparatus 1 is capable of displaying the aerial image 18 also in parallel with the device surface of the optical device 17.

FIG. 19 is a ray tracing diagram of the aerial display apparatus 1. The parameter in FIG. 19 is set to $\theta_{10}$=45 degrees. The light emitted from the display apparatus 15 produces an image at a plane-symmetrical position with respect to the optical device 17 as a plane of symmetry, thereby displaying an aerial image 18 at the imaging position.

According to the second embodiment, the aerial display apparatus 1 can be realized by arranging the display apparatus 15 obliquely with respect to the optical device 17. Other effects are the same as those of the first embodiment.

(3) Third Embodiment

The third embodiment is another configuration example in which the display device 14 is disposed obliquely with respect to the optical device 17.

Figure 20:
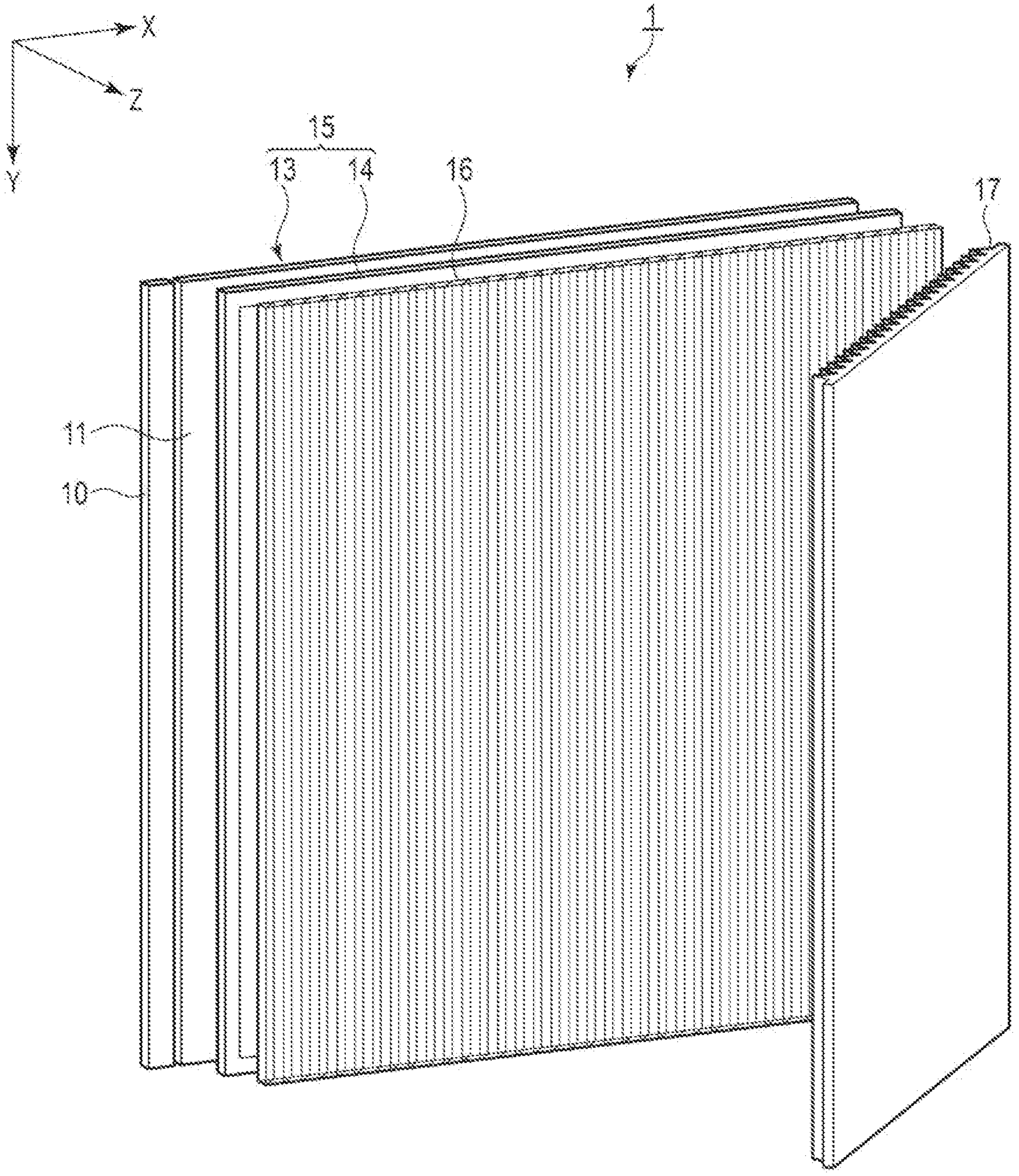
FIG. 20 is a perspective view of an aerial display apparatus according to the third embodiment of the present invention.
Figure 21:
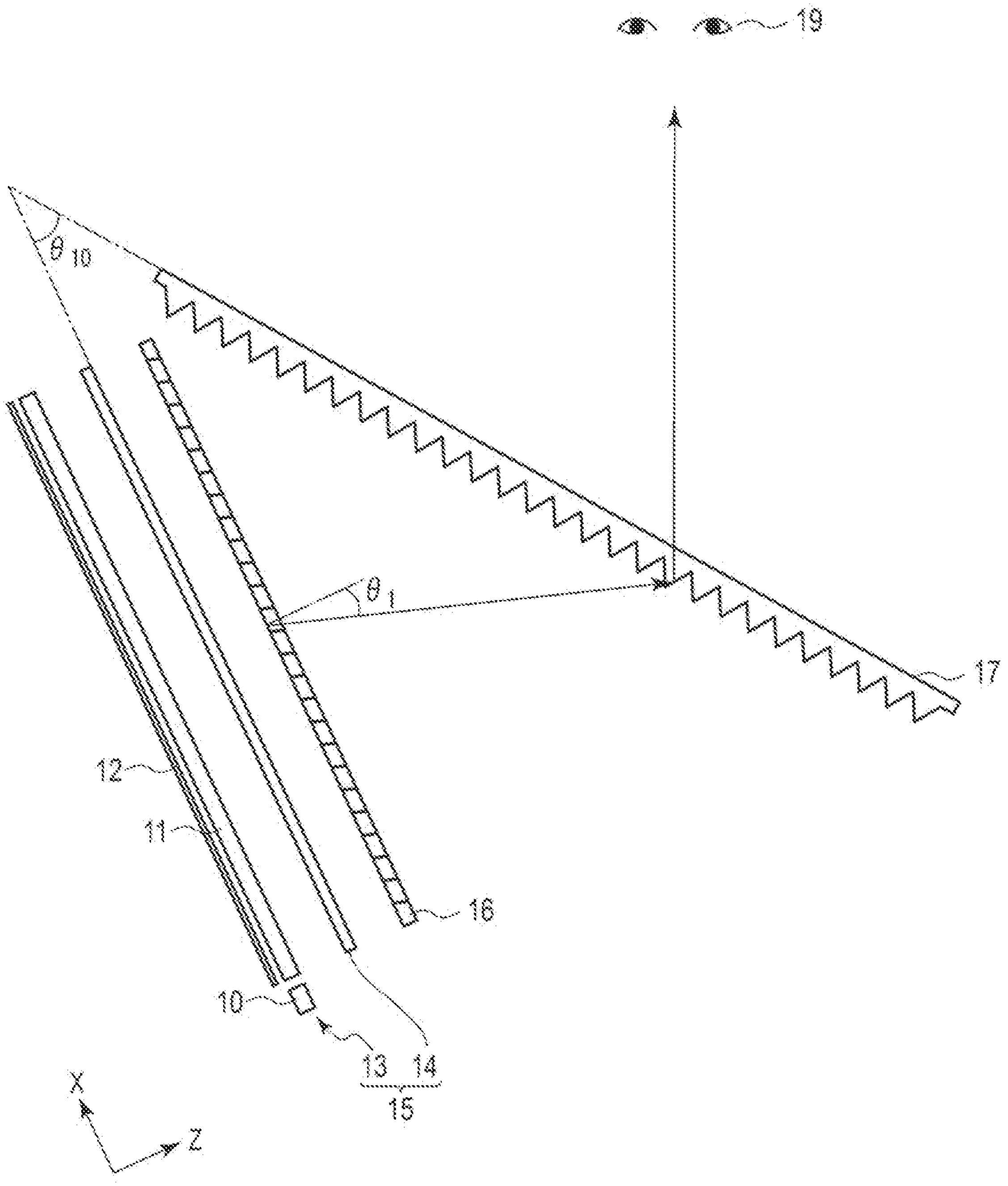
FIG. 21 is a side view of the aerial display apparatus.

FIG. 20 is a perspective view of the aerial display apparatus 1 according to the third embodiment of the present invention. FIG. 21 is a side view of the aerial display apparatus 1. In FIG. 20, the X direction represents a direction along one side of the display apparatus 15, the Y direction represents a direction orthogonal to the X direction on a horizontal plane of the display apparatus 15, and the Z direction represents a direction orthogonal to an XY plane.

The aerial display apparatus 1 includes a display apparatus 15, a light control device 16, and an optical device 17. The display apparatus 15 includes a lighting device 13 and a display device 14. The configurations of the display apparatus 15, the light control device 16, and the optical device 17 are the same as those in the first embodiment.

The light control device 16 is disposed above the display apparatus 15 so as to be parallel to the display apparatus 15.

The optical device 17 is arranged obliquely at an angle $\theta_{10}$ with respect to the display apparatus 15. In the third embodiment, the angle $\theta_{10}$ is larger than 0 degrees and smaller than 45 degrees, for example. It is more preferable that the angle $\theta_{10}$ be approximately 30 degrees.

As shown in FIG. 21, the light emitted from the display apparatus 15 is incident on the light control device 16. In the light emitted from the display apparatus 15, a light component at the angle $\theta_1$ (including light components in a predetermined angular range defined around the angle $\theta_1$) is transmitted through the light control device 16. The angle $\theta_1$ according to the third embodiment can be suitably set. The light that has been transmitted through the light control device 16 enters the optical device 17. The optical device 17 produces an image of the incident light in the aerial space on the side opposite to the light control device 16 and displays an aerial image 18 in the aerial space. The aerial display apparatus 1 is capable of displaying the aerial image 18 also in parallel with the device surface of the optical device 17.

Figure 22:
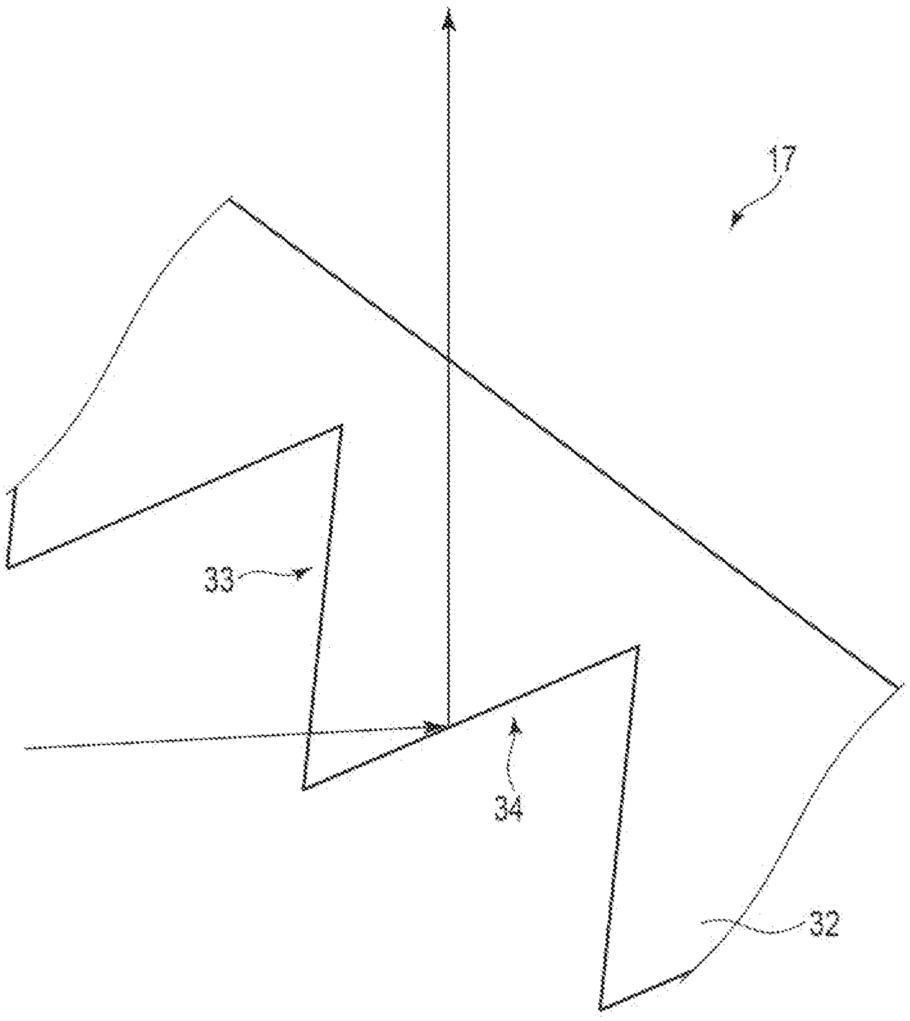
FIG. 22 is a diagram illustrating an optical path of light reflected on the optical device.

FIG. 22 is a diagram illustrating an optical path of light reflected on the optical device 17. The arrows in FIG. 22 represent optical paths. The light that has been transmitted through the light control device 16 is incident on the incident surface 33 of the optical device 17 and reflected on the reflection surface 34. Here, the light unnecessary for display of an aerial image is shielded by the light control device 16, and is therefore barely incident on the optical device 17.

According to the third embodiment, the aerial display apparatus 1 can be realized by disposing the display apparatus 15 obliquely with respect to the optical device 17. In addition, the light control device 16 can shield the light components that are not necessary for an aerial image. This can suppress deterioration of the display characteristics of the aerial display apparatus 1. Other effects are the same as those of the first embodiment.

In the third embodiment, the light control device 16 may be omitted.

In the above embodiments, a liquid crystal display device is described as an example of the display apparatus 15. The display apparatus 15 is not limited thereto, however. As the display apparatus 15, a self-luminous organic electroluminescence (EL) display device, a micro-light emitting diode (microLED) display device, or the like can be used. In the microLED display device, light in red (R), green (G), and blue (B) that constitutes a pixel is respectively emitted by an LED.

The present invention is not limited to the above embodiments, and various modifications can be made without departing from the gist of the present invention at an implementation stage. In addition, the embodiments may be appropriately combined with each other, and in such a case, combined effects can be attained. Furthermore, various inventions are included in the above-described embodiments, and various inventions can be extracted by combining selected ones of the disclosed structural components. Even if some structural components are omitted from the structural components shown in the embodiment, the configuration without these structural components can be extracted as an invention if the problem can be solved and the effects can be attained.

What is claimed is:

1. An aerial display apparatus comprising:
a display device configured to display an image; and
an optical device arranged to receive light from the display device and reflecting the light from the display device to a side opposite to the display device,
wherein the optical device includes a planar base member, and a plurality of optical elements provided below the base member as viewed from a viewer, each extending in a first direction and aligned in a second direction orthogonal to the first direction,
each of the optical elements has an incident surface and a reflection surface which are inclined with respect to a normal direction of the base member and are in contact with each other,
the optical device is arranged in such a manner as to be capable of receiving, on the incident surface, light that is included in the light from the display device and contributes to image formation, and the optical device is configured to form an aerial image in an aerial space on the side opposite to the display device, and
the optical device forms an aerial image at a position parallel to the optical device.

2. The aerial display apparatus according to claim 1, wherein
an angle of the reflection surface with respect to the normal direction of the base member is set such that an incident angle of light incident on the reflection surface is larger than a critical angle.

3. The aerial display apparatus according to claim 1, wherein
an angle of the incident surface with respect to the normal direction of the base member is set such that an incident angle of light incident on the incident surface is smaller than a critical angle.

4. The aerial display apparatus according to claim 1, wherein
the display device and the optical device are arranged in parallel to each other.

5. The aerial display apparatus according to claim 1, further comprising:
a light control device arranged between the display device and the optical device and transmitting part of the light from the display device.

6. The aerial display apparatus according to claim 5, wherein the light control device includes a plurality of transparent members and a plurality of light shielding members which are alternately arranged, and the light shielding members are inclined with respect to a normal direction of the light control device.

7. An aerial display apparatus comprising:

a display device configured to display an image; and an optical device arranged to receive light from the display device and reflecting the light from the display device to a side opposite to the display device, wherein the optical device includes a planar base member, and a plurality of optical elements provided below the base member as viewed from a viewer, each extending in a first direction and aligned in a second direction orthogonal to the first direction, each of the optical elements has an incident surface and a reflection surface which are inclined with respect to a normal direction of the base member and are in contact with each other, the optical device is arranged in such a manner as to be capable of receiving, on the incident surface, light that is included in the light from the display device and contributes to image formation, and the optical device is configured to form an aerial image in an aerial space on the side opposite to the display device, and the display device and the optical device are arranged in parallel to each other.

8. The aerial display apparatus according to claim 7, wherein the optical device forms an aerial image at a position parallel to the optical device.

9. The aerial display apparatus according to claim 7, wherein an angle of the reflection surface with respect to the normal direction of the base member is set such that an incident angle of light incident on the reflection surface is larger than a critical angle.

10. The aerial display apparatus according to claim 7, wherein an angle of the incident surface with respect to the normal direction of the base member is set such that an incident angle of light incident on the incident surface is smaller than a critical angle.

11. The aerial display apparatus according to claim 7, further comprising:

a light control device arranged between the display device and the optical device and transmitting part of the light from the display device.

12. The aerial display apparatus according to claim 11, wherein the light control device includes a plurality of transparent members and a plurality of light shielding members which are alternately arranged, and the light shielding members are inclined with respect to a normal direction of the light control device.

13. An aerial display apparatus comprising:

a display device configured to display an image;

an optical device arranged to receive light from the display device and reflecting the light from the display device to a side opposite to the display device; and a light control device arranged between the display device and the optical device and transmitting part of the light from the display device, wherein the optical device includes a planar base member, and a plurality of optical elements provided below the base member as viewed from a viewer, each extending in a first direction and aligned in a second direction orthogonal to the first direction, each of the optical elements has an incident surface and a reflection surface which are inclined with respect to a normal direction of the base member and are in contact with each other, the optical device is arranged in such a manner as to be capable of receiving, on the incident surface, light that is included in the light from the display device and contributes to image formation, and the optical device is configured to form an aerial image in an aerial space on the side opposite to the display device, the light control device includes a plurality of transparent members and a plurality of light shielding members which are alternately arranged, and the light shielding members are inclined with respect to a normal direction of the light control device.

14. The aerial display apparatus according to claim 13, wherein an angle of the reflection surface with respect to the normal direction of the base member is set such that an incident angle of light incident on the reflection surface is larger than a critical angle.

15. The aerial display apparatus according to claim 13, wherein an angle of the incident surface with respect to the normal direction of the base member is set such that an incident angle of light incident on the incident surface is smaller than a critical angle.

16. The aerial display apparatus according to claim 13, wherein the optical device forms an aerial image at a position parallel to the optical device.

17. The aerial display apparatus according to claim 13, wherein the display device and the optical device are arranged in parallel to each other.

* * * * *